(12) United States Patent
Paczkowski et al.

(10) Patent No.: US 12,531,950 B2
(45) Date of Patent: Jan. 20, 2026

(54) DIRECT LEDGER REPORTING OF USER EQUIPMENT DATA USAGE FOR TELECOMMUNICATIONS NETWORKS

(71) Applicant: T-MOBILE INNOVATIONS LLC, Overland Park, KS (US)

(72) Inventors: Lyle Walter Paczkowski, Mission Hills, KS (US); Marouane Balmakhtar, Fairfax, VA (US); Anand Jayaraman, Suwanee, GA (US)

(73) Assignee: T-Mobile Innovations LLC, Overland Park, KS (US)

( * ) Notice: Subject to any disclaimer, the term of this patent is extended or adjusted under 35 U.S.C. 154(b) by 525 days.

(21) Appl. No.: 18/063,382

(22) Filed: Dec. 8, 2022

(65) Prior Publication Data
US 2024/0195919 A1    Jun. 13, 2024

(51) Int. Cl.
*H04M 15/00* (2024.01)
*H04W 4/24* (2018.01)

(52) U.S. Cl.
CPC ........... *H04M 15/41* (2013.01); *H04M 15/67* (2013.01); *H04W 4/24* (2013.01); *H04M 15/8214* (2013.01)

(58) Field of Classification Search
CPC .. H04M 15/41; H04M 15/67; H04M 15/8214; H04M 15/58; H04M 15/61; H04M 15/66; H04W 4/24; G06N 20/00; H04L 12/1407
USPC ....................................................... 455/406
See application file for complete search history.

(56) References Cited

U.S. PATENT DOCUMENTS

2020/0287919 A1* 9/2020 Ravindranath ......... H04L 41/16
2022/0188819 A1* 6/2022 Ognjanovic .......... H04L 9/3236

OTHER PUBLICATIONS

Unknown, "amdocs real-time billing—driving 5G monetization and user engagement," www.amdocs.com, https://www.amdocs.com/sites/default/files/2021-07/real-time-billing-datasheet.pdf, Jul. 2021, pp. 1-4.
Unknown, "Telecommunications mediation," Wikipedia, https://en.wikipedia.org/wiki/Telecommunications_mediation, Mar. 5, 2021, pp. 1-3.

* cited by examiner

*Primary Examiner* — Huy C Ho
(74) *Attorney, Agent, or Firm* — Shook, Hardy & Bacon L.L.P.

(57) ABSTRACT

Systems and methods for direct ledger reporting of user equipment (UE) data usage for telecommunications networks are provided. Embodiments of the present disclosure, at least in part, assess telecommunications network data usage by decentralizing the tasks of monitoring and collecting data regarding the types and quantity of data usage, delegating those tasks to data usage record synthesizers that are instantiated at, or close to, the point and/or device where the data is being consumed. In some embodiments, assessing data usage may include determining a classification of an instance of UE network data usage based on data packet traffic; determining ledger record data for inclusion in one or more fields of a ledger record based on the classification; generating a ledger record based on the one or more fields of ledger record data; and transmitting the ledger record via the telecommunications network for recording to an immutable data usage ledger.

20 Claims, 12 Drawing Sheets

DIRECT LEDGER REPORTING OF USER EQUIPMENT DATA USAGE FOR TELECOMMUNICATIONS NETWORKS

BACKGROUND

While early generations of wireless cellular technologies primarily focused on providing wireless voice connectivity, the mobile communications industry has evolved so that today a telecommunication network primarily carries traffic related to data services such as e-mail, messaging services (e.g., Short Message Service (SMS)), Internet web-browsing, social media applications, video conferencing, and music and/or video streaming. Moreover, current technologies such as $3^{rd}$ Generation Partnership Project (3GPP) 5G ($5^{th}$ generation), and others in development, provide platforms where myriad "smart" devices (computers, machines, appliances, sensors, and the like) may communicate data with each other, and with back-end servers and services, through a telecommunications network via both wireless and wired access networks. As these data services and the number of devices using these data service-grow, the network operator's task of monitoring and assessing the types and quantity of data usage flowing through their network has grown increasingly complex. In fact the volume of data generated, transported via the network, and stored for record keeping, by a network operator associated with assessing their subscriber's network data usage, may itself be on the order of tens of billions of records per day.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. The present disclosure is directed, in part, to systems and methods for providing direct ledger reporting of user equipment data usage for telecommunications networks, substantially as shown and/or described in connection with at least one of the Figures, and as set forth more completely in the claims.

One or more of the embodiments presented in the disclosure provide for, among other things, systems and methods for providing direct ledger reporting of user equipment (UE) data usage for telecommunications networks. Embodiments of the present disclosure, at least in part, assess telecommunications network data usage by decentralizing the tasks of monitoring and collecting data regarding the types and quantity of data usage, delegating those tasks to a plurality of data usage record synthesizers that are instantiated at, or close to, the point and/or device where the data is being consumed. By establishing these functions further towards the periphery of the telecommunications network, improvements are realized in terms of network usage and efficiencies as the data flow created and computing resources consumed to access subscriber data usage is substantially detached from network operations of the operator network core.

In some embodiments, a data usage record synthesizer is provided that includes a data usage classification model. The data usage classification model may comprise a machine learning model or other logic (e.g., rules-based logic) that reads data packets representing a data usage instance (for example, a data session) by the UE, and based on those data packets classifies the data usage as a particular type and quantity. Such data usage may include one or both of downlink (DL) data received by the UE from the network, and uplink (UL) data transmitted by the UE to the network. In some embodiments, based on a classification of a data usage instance, the data usage record synthesizer determines content of one or more ledger fields of a ledger record, populates the ledger record with the determined content, and transmits the ledger record for recordation in a network hosted immutable ledger. In some embodiments, the data usage record synthesizer may comprise at least one Dapp that includes a plurality of smart contracts, where an individual smart contract may be associated with one or more of the potential data usage classifications. The Dapp and/or data usage record synthesizer may determine the classification of a data usage instance, and then execute a smart contract corresponding to that classification. The selected smart contract may be programed to generate a ledger record comprising a predefined set of data fields that, in combination, describe the type and quantity of network data usage consumed in a specific data usage instance by that UE. Further, in some embodiments, a smart contract may be programed to generate a ledger record that formats the data in the fields of the ledger record in a format or structure customized to a potential reader of the ledger record (e.g., based on a policy associated with a ledger client system that accesses the data usage ledger).

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
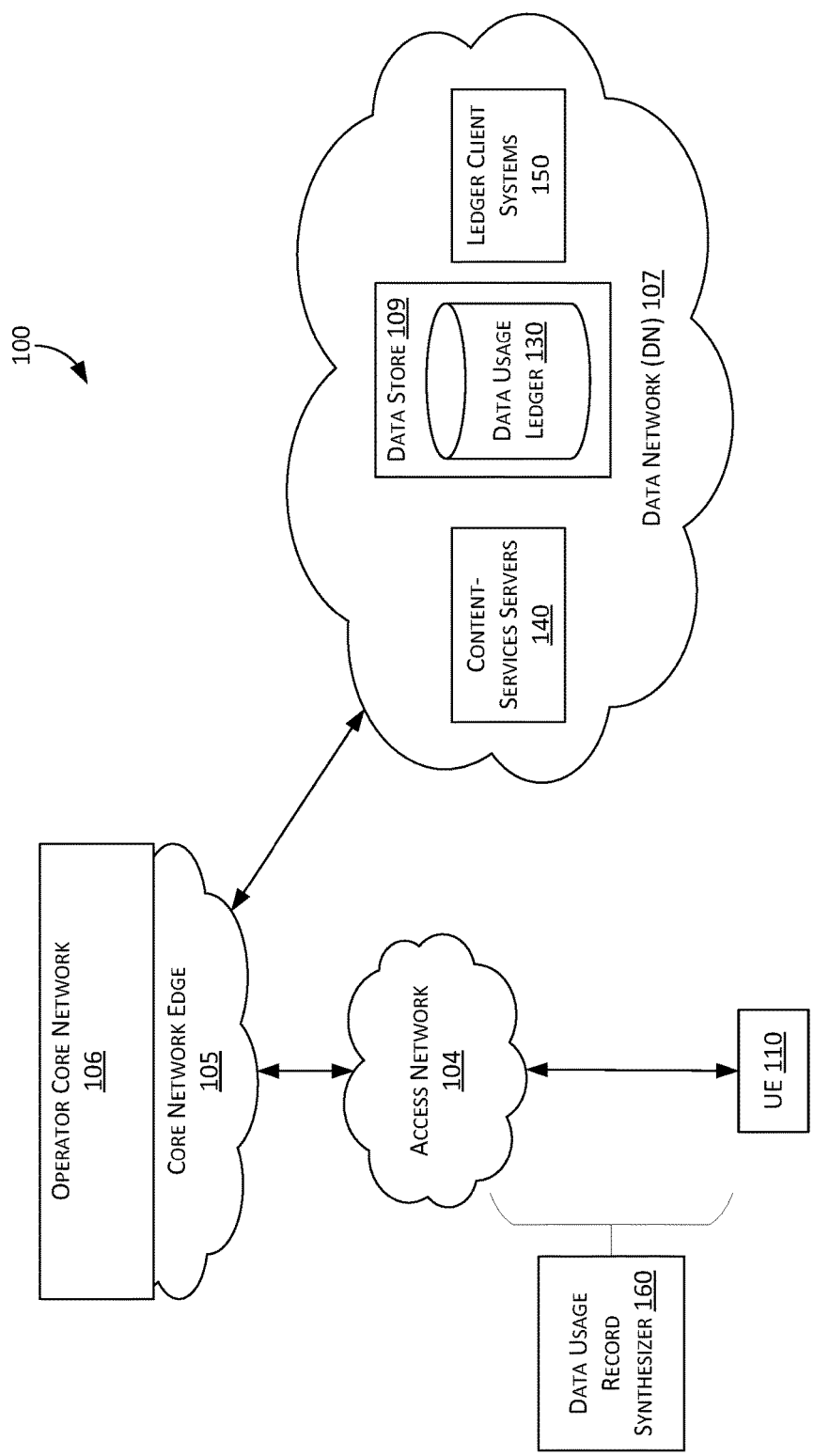
FIG. 1 is a diagram illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments presented in the disclosure provide for, among other things, systems and methods for providing direct ledger reporting of user equipment (UE) data usage for telecommunications networks. Current processes today for assessing telecommunications network data usage typically involves a process referred to as mediation. In mediation, network elements across the telecommunications network generate files referred to as detail reports (e.g., call detail reports (CDRs), event detail reports (EDRs), and/or other detail reports). These files are continuously generated from detail reports, and may comprise on the order of tens of billions of records per day (corresponding to a wide variety of different services) that must be aggregated, collated, and then reformed by the telecommunications network operator into formats that can be meaningfully utilized by downstream systems, such as for use by rating engines, retail and/or wholesale billing, network capacity planning, network traffic management, network reliability and/or security procedures, fraud management, or for any other analysis. These mediation processes are burdensome to network operators and to the operation of their telecommunications networks due to the burdens experienced in generating, processing, augmenting, re-formatting, transporting, and storing, the sheer volume of data produced, causing latencies is the ability to use the data, and diverting network resources that otherwise could be used to deliver services to network subscribers.

Embodiments of the present disclosure, at least in part, address the current deficiencies in assessing telecommunications network data usage by decentralizing the tasks of monitoring and collecting data regarding the types and quantity of data usage, delegating those tasks to data usage record synthesizers that are instantiated at, or close to, the point and/or device where the data is being consumed. By establishing these functions further towards the periphery of the telecommunications network, improvements are realized in terms of network usage and efficiencies as the data flow created and computing resources consumed to access subscriber data usage is substantially detached from network operations of the operator network core.

For example, many data consuming UE operating on a telecommunications network, such as computers, smart phones, tablets, and other smart devices, have sufficient on-device computing resources to execute a data usage record synthesizer as a trusted application, and authenticate themselves as a trusted device to the operator network core of the telecommunications network. Such trusted UE may, for example, comprise 3GPP compliant UE (e.g., 3G, 4G, 5G devices). In such embodiments, the UE may execute the data usage record synthesizer as a trustlet that includes a distributed app (Dapp) or other application in a trusted environment that evaluates and classifies data usage by that UE, for example, with respect to data type and quantity of data usage. In some embodiments, the data usage record synthesizer includes a data usage classification model. The data usage classification model may comprise a machine learning model or other logic (e.g., rules-based logic) that reads data packets representing a data usage instance by the UE, and based on those data packets classifies the data usage as having a particular type and quantity. Such data usage may include one or both of downlink (DL) data received by the UE from the network, and uplink (UL) data transmitted by the UE to the network. In some embodiments, based on a classification of a data usage instance (for example, a data session), the data usage record synthesizer determines the information to record in one or more ledger fields of a ledger record, populates the ledger record with the determined information, and transmits the ledger record for recordation in a network hosted immutable ledger. For example, for data usage classified as an SMS messaging event, the data usage record synthesizer may select ledger fields including one or more of, but not limited to, a device identified (device ID) of the UE, a session ID associated with the SMS messaging event, a quantification of the amount of data transported over the network (e.g., a number of Mbytes), and/or a timestamp indicating a time and/or date when the SMS message event took place. For data usage classified as a voice call, the data usage record synthesizer may select ledger fields including one or more of, but not limited to, a device ID of the UE, a device ID of the UE of another party to the voice call, the duration (e.g., number of minutes) of the voice call, and/or a timestamp indicating a time and/or date when the voice call took place. For each potential type of data usage classification, the data usage record synthesizer may select an appropriate combination of fields for the ledger record, and populate those fields with their corresponding data. In some embodiments, the data usage record synthesizer may comprise at least one Dapp that includes a plurality of smart contracts, where each smart contract is associate with one or more of the potential data usage classifications. The Dapp and/or data usage record synthesizer may determine the classification of a data usage instance, and execute a smart contract corresponding to that classification. For example, for a data usage instance classified as an SMS message event, the Dapp may invoke and execute a smart contract corresponding to SMS message events. For a data usage instance classified as a voice call event, the Dapp may invoke and execute a smart contract corresponding to voice calls. For a data usage instance classified as a streaming music service, the Dapp may invoke and execute a smart contract corresponding to streaming music services. Some classifications of data usage may invoke a combination of smart contracts. The selected smart contract may be programed to generate a ledger record comprising a predefined set of data fields that in combination describe the type and quantity (and/or other characteristic) of network data usage consumed during a specific data usage instance by that UE. Further, in some embodiments, a smart contract may be programed to generate a ledger record that formats the data in the fields of the ledger record in a format or structure customized to a potential reader of the ledger record (e.g., based on a policy associated with a ledger client system that accesses the data usage ledger). For example, a smart contract may be programed to record data fields into a ledger record using a JavaScript Object Notation (JSON) data record format, extensible markup language (XML) data record, and/or other data record format, where that format is used by an expected reader of the ledger record. In this way, the relevant data usage information available from the data usage ledger is readily consumable directly from the format in which it was captured and recorded.

Once the fields of the ledger record are populated, the Dapp may record the details of the data usage instance by transmitting the ledger record to an immutable ledger (such as a block-chain technology or distributed ledger technology (DLT) ledger, for example). Because the ledger record was generated by a tamperproof, unalterable smart contract executed in a trusted environment of a trusted UE, the ledger record may be considered as having a sense of truth, such that the ledger record can be relied upon of conveying an accurate measurement of the data usage consumed by that UE for that particular data usage instance. Moreover, because the ledger record is stored to an immutable ledger, that immutable ledger may be trusted as a repository having a sense of truth that the ledger records it stores are accurate measurement of data usage. In some embodiments, a ledger record may itself comprise a smart contract, which may be used, for example, by a reader of the ledger record in the process of retrieving information about the data usage instance.

In some embodiments, the UE may not be a trusted UE from the perspective of the operator network core. That is, the UE may be a non-3GPP device that is unable to authenticate itself as a trusted device to the operator network core, and/or may not have sufficient on-device computing resources to execute a data usage record synthesizer as a trusted application. For example, an untrusted UE may have sufficient resources to implement a TCP/IP stack and gain accesses to a non-3GPP access network (such as a customer premises local area network (LAN) or wide area network (WAN) for example), but otherwise lack credentials and/or functions to authenticate with a telecommunications network's operator network core. An untrusted UE may lack a secure execution environment to execute a smart contract that generates a ledger record having a sense of truth. In order to record into the ledger network data usage by such untrusted UE, a data usage record synthesizer may be implemented as a network edge application, such as on a node of a non-3GPP access network (e.g., a customer premises equipment (CPE) network), that can be authenticated with the operator network core. In such implementations, for example, network traffic that is routed to and/or from an untrusted UE may be passed through or otherwise made observable to the data usage record synthesizer and classified in the same manner as described above.

Once stored to the ledger, ledger records may be read and assessed for various purposes. For example, in some embodiments, ledger records describing network data usage may be used by network planners to determine when and how to implement network expansions or upgrades. Network ledger records describing network data usage may be used by network technicians to manage network traffic, detect and/or troubleshoot network operation anomalies or network service disruptions (e.g., from equipment failures), and/or detect malicious activity (e.g., hacking or other unauthorized activities). In some embodiments, network ledger records describing network data usage may be used for billing purposes, such as to obtain a remittance from subscribers for data usage.

FIG. 1 is a diagram illustrating an example network environment 100 embodiment for a wireless communication system. Network environment 100 is but one example of a suitable telecommunications network and is not intended to suggest any limitation as to the scope of use or functionality of the embodiments disclosed herein. Neither should the network environment be interpreted as having any dependency or requirement relating to any one or combination of components illustrated.

As shown in FIG. 1, network environment 100 comprises an operator core network 106 (also referred to as a "core network") that provides one or more network services to one or more UE 110 via at least one access network 104. In some embodiments, network environment 100 comprises, at least in part, a wireless communications network.

In some embodiments, the access network 104 comprises one or more radio access networks (RANs). A RAN is often referred to as a base station, cell site, or cellular base station. The RAN may implement wireless connectivity using, for example, 3GPP technologies. The access network 104 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the access network 104 comprises a non-3GPP customer premises network, such as a local area network or intra-net comprising one or more wireless access points (APs) such as, but not limited to, IEEE 802.11 (WiFi), and/or IEEE 802.15 (Bluetooth) access points.

The access network 104 may comprise a multi-modal network (for example comprising one or more multi-modal access devices) where multiple radios supporting different systems are integrated into the access network 104. Such a multi-modal access network 104 may support a combination of 3GPP radio technologies (e.g., 4G, 5G and/or 6G) and/or non-3GPP radio technologies. In some embodiment, the access network 104 may comprise a terrestrial wireless communications base station and/or may be at least in part implemented as a space-based access network (e.g., comprising a space-based wireless communications base station).

In particular, individual UE 110 may communicate with the operator core network 106 via the access network 104 over one or both of uplink (UL) radio frequency (RF) signals and downlink (DL) radio frequency (RF) signals and/or via wired network connections. The access network 104 may be coupled to the operator core network 106 via a core network edge 105 that comprises wired and/or wireless network connections that may themselves include wireless relays and/or repeaters. In some embodiments, the access network 104 is coupled to the operator core network 106 at least in part by a backhaul network such as the Internet or other public or private network infrastructure. Core network edge 105 comprises one or more network nodes or other elements of the operator core network 106 that may define the boundary of the operator core network 106 and may serve as the architectural demarcation point where the operator core network 106 connects to other networks such as, but not limited to access network 104, the Internet, or other third-party networks.

It should be understood that in some aspects, the network environment 100 may not comprise a distinct network operator core 106, but rather may implement one or more features of the network operator core 106 within other portions of the network, or may not implement them at all, depending on various carrier preferences.

As shown in FIG. 1, network environment 100 may also comprise at least one data network (DN) 107 coupled to the operator core network 106 (e.g., via the network edge 105). Data network 107 may include a data store 109 that includes data usage ledger 130 as further discussed herein. In some embodiments, UE 110 may access services and/or content provided by one or more content-services servers 140 of DN 107. In some embodiments, DN 107 may include one or more ledger client systems 150 that access records of the data usage ledger 130 to perform one or more operations, as discussed herein. As discussed in greater detail below, the data usage ledger 130 may comprise an element of a distributed ledger network (DLN) and/or distributed ledger technology (DLT) based records repository.

Generally, an individual UE 110 may comprise a device capable of unidirectional or bidirectional communication with the access network 104 via wireless and/or wired communication links. The network environment 100 may be configured for wirelessly connecting UEs 110 to other UEs 110 via the same access network 104, via other access networks, via other telecommunication networks, and/or to connect UEs to a publicly-switched telecommunication network (PSTN). The network environment 100 may be generally configured for wirelessly connecting a UE 110 to data or services that may be accessible on one or more application servers or other functions, nodes, or servers. The operating environment 100 may be generally configured, in some embodiments, for wirelessly connecting UE 110 to data or services that may be accessible on one or more application servers or other functions, nodes, or servers (such as by servers 140 of data network 107). In these communications between the UE 110 and access network 104, a data usage record synthesizer 160 monitors, classifies, and stores ledger records of the UE 110's data usage to the data usage ledger 130.

UE 110 are in general, forms of equipment and machines such as but, not limited to, Internet-of-Things (IOT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 110 may include computing devices such as, but not limited to, handheld personal computing devices, cellular phones, smart phones, tablets, laptops, and similar consumer equipment, or stationary desktop computing devices, workstations, servers and/or network infrastructure equipment. As such, the UE 110 may include both mobile UE and stationary UE. Moreover, UE 110 may comprise 3GPP and non-3GPP devices.

The UE 110 can include one or more processors, and one or more non-transient computer-readable media for executing code to carry out the functions of the UE 110 described herein (including in some embodiments, one or more functions of data usage record synthesizer 160). The computer-readable media may include computer-readable instructions executable by the one or more processors. In some embodiments, the UE 110 may be implemented using a computing device 1100 as discussed below with respect to FIG. 11.

As previously discussed, the data usage record synthesizer 160 may be implemented as an application resident on the UE 110, or as a network edge application, such as on a node (e.g., a server or other network device) of the access network 104. The data usage record synthesizer 160 evaluates and classifies data usage consumed by the UE 110, for example, with respect to data type and quantity of data usage. Such data usage may include one or both of downlink (DL) data received by the UE 110 from the access network 104, and/or uplink (UL) data transmitted by the UE 110 to the access network 104. The data usage record synthesizer 160 measures characteristics of data usage instance (for example, a data session) and generates a classification of the data usage instance in order to generate and format data indicative of the type and quantity of network data into one or more ledger fields of a ledger record. For each potential type of data usage classification, the data usage record synthesizer 106 may select an appropriate combination of fields for the ledger record, and populate those fields with their corresponding data. As further discussed below, the data usage record synthesizer 106 may comprise at least one Dapp that includes a plurality of smart contracts that generate the ledger record based on UE 110 data usage observed by the data usage record synthesizer 160. The ledger record may be transmitted by the data usage record synthesizer 106 to the data usage ledger 130 and subsequently utilized for various purposes by one or more ledger client systems 150.

Figure 2:
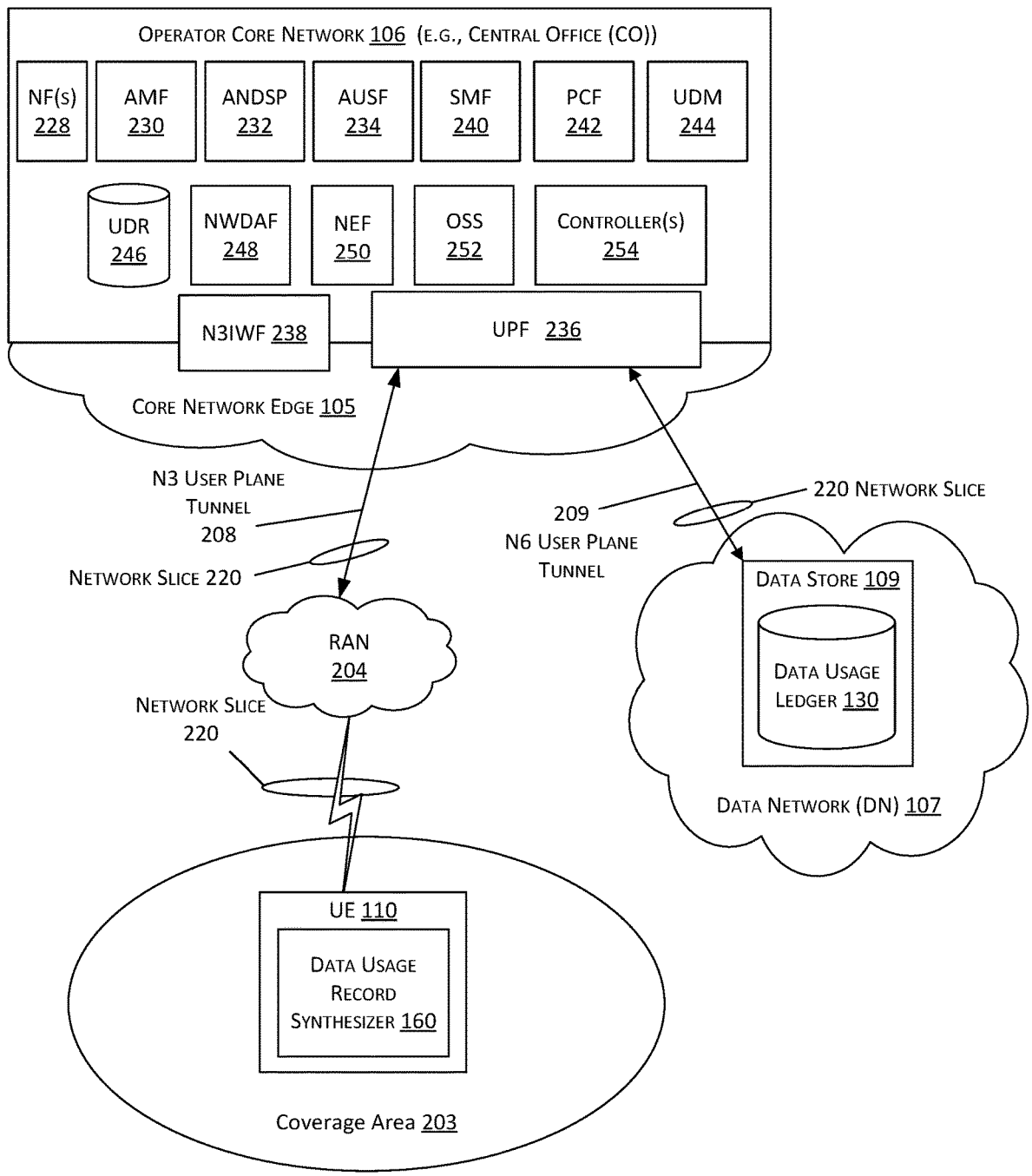
FIG. 2 is a diagram illustrating an example implementation of an operator core network for a networking environment comprising a radio access network (RAN), in accordance with some embodiments described herein.

Referring now to FIG. 2, FIG. 2 illustrates an example implementation of the networking environment 100 of FIG. 1, wherein the access network 104 comprising at least a 3GPP based Radio Access Network (RAN) 204. In some embodiments, the RAN 204 comprises a radio access network (RAN), often referred to as a cellular base station. The RAN 204 may be referred to as a gNodeB in the context of a 5G New Radio (NR) implementation, or other terminology depending on the specific implementation technology. In some embodiments, the RAN 204 may comprise in part components of a customer premises network, such as a distributed antenna system (DAS) for example. In some embodiments, the RAN 204 may comprise a non-terrestrial base station, such as a base station implemented by an Earth orbiting satellite. The UE 110 may operate within a coverage area 203 of the RAN 204.

In some implementations, the operator core network 106 may comprise modules, also referred to as network functions (NFs), generally represented in FIG. 2 as NF(s) 228. Such network functions may include, but are not limited to, one or more of a core access and mobility management function (AMF) 230, an access network discovery and selection policy (ANDSP) 232, an authentication server function (AUSF) 234, a user plane function (UPF) 236, non-3GPP Interworking Function (N3IWF) 238, a session management function (SMF) 240, a policy control function (PCF) 242, unified data management (UDM) 244, an unified data repository (UDR) 246, Network Data Analytics Function (NWDAF) 248, a network exposure function (NEF) 250, and an operations support system (OSS) 252. Implementation of these NFs of the operator core network 106 may be executed by one or more controllers 254 on which these network functions are orchestrated or otherwise configured to execute utilizing processors and memory of the one or more controllers 254. The NFs may be implemented as physical and/or virtual network functions, container network functions, and/or cloud-native network functions.

Notably, nomenclature used herein is used with respect to the 3GPP 5G architecture. In other aspects, one or more of the network functions of the operator core network 106 may take different forms, including consolidated or distributed forms that perform the same general operations. For example, the AMF 230 in the 3GPP 5G architecture is configured for various functions relating to security and access management and authorization, including registration management, connection management, paging, and mobility management; in other forms, such as a 4G architecture, the AMF 230 of FIG. 2 may take the form of a mobility management entity (MME). The operator core network 106 may be generally said to authorize rights to and facilitate access to an application server/service such as provided by application function(s) requested by one or more UE, such as UE 110. In some embodiments, the at least one data network (DN) 107 may be coupled to the operator core network 106, for example via the network edge 105.

As shown in FIG. 2, UPF 236 represents at least one function of the operator core network 106 that may extend into the core network edge 105. In some embodiments, the RAN 204 is coupled to the UPF 236 within the core network edge 105 by a communication link that includes an N3 user plane tunnel 208. For example, the N3 user plane tunnel 208 may connect a cell site router of the RAN 104 to an N3 interface of the UPF 236. In some embodiments, the data usage ledger 130 may be implemented at least in part by a data store 109 within the DN 107. The data store 109 and/or data usage ledger 130 may be coupled to the UPF 236 in the core network edge 105 by a N6 user plane tunnel 209. For example, the N6 user plane tunnel 209 may connect a network interface (e.g., a switch, router and/or gateway) of the DN 107 to an N6 interface of the UPF 236. In some embodiments, the data usage ledger 130 and/or data store 109 may be implemented at least in part as a component of the operator core network 106.

The AMF 230 facilitates mobility management, registration management, and connection management for 3GPP devices such as a UE 110. ANDSP 232 facilitates mobility management, registration management, and connection management for non-3GPP devices. AUSF 234 may receive authentication requests from the AMF 230 and interacts with UDM 244, for example, for SIM authentication and/or to authenticate a UE 110 based on another device ID. N3IWF 238 provides a secure gateway for non-3GPP network access, which may be used for providing connections for UE 110 access to the operator core network 106 over a non-3GPP access network. SMF module 240 facilitates initial creation of protocol data unit (PDU) sessions using session establishment procedures. The PCF 242 maintains and applies policy control decisions and subscription information. Additionally, in some aspects, the PCF 242 maintains quality of service (QOS) policy rules. For example, the QoS rules stored in a unified data repository (UDR) 246 can identify a set of access permissions, resource allocations, or any other QoS policy established by an operator. In some embodiments, the PCF 242 maintains subscription information indicating one or more services and/or micro-services subscribed to by each UE 110. Such subscription information may include subscription information pertaining to a subscription for access to the data usage ledger 130. The UDM 244 manages network user data including, but not limited to, data storage management, subscription management, policy control, and core network 106 exposure. NWDAF 248 collects data (for example, from UE, other network functions, application functions and operations, administration, and maintenance (OAM) systems) that can be used for network data analytics. The OSS 252 is responsible for the management and orchestration of the operator core network 106, and the various physical, virtual network functions, container network functions, controllers, compute nodes, and other elements that implement the operator core network 106.

Some aspects of operating environment 100 include the UDR 246 storing information relating to access control and service and/or micro-service subscriptions. The UDR 246 may be configured to store information relating to such subscriber information and may be accessible by multiple different NFs in order to perform desirable functions. For example, the UDR 246 may be accessed by the AMF 230 in order to determine subscriber information pertaining the UE 110, accessed by a PCF 242 to obtain policy related data, accessed by NEF 250 to obtain data that is permitted for exposure to third party applications (such as applications executed by UE 110, for example). Other functions of the NEF 250 include monitoring of UE related events and posting information about those events for use by external entities, and providing an interface for provisioning UEs (via PCF 242) and reporting provisioning events to the UDR 246. Although depicted as a unified data management module, UDR 246 can be implemented as a plurality of network function (NF) specific data management modules.

The UPF 236 is generally configured to facilitate user plane operation relating to packet routing and forwarding, interconnection to a data network (e.g., DN 107), policy enforcement, and data buffering, among other operations. Using network slicing (e.g., using 5G software-defined networking (SDN) and/or 5G network slice selection function (NSSF)), the UPF 236 may establish a dedicated network slice (such as network slice 220) for one or more data channels of the UE 110 that act as, in essence, as a distinct network (for example, establishing its own QoS, provisioning, and/or security) within the same physical network architecture of the core network edge 105. For example, in different implementations, a UE 110 may be assigned a network slick such as an Enhanced Mobile Broadband (eMBB) 5G network slice, a Massive Machine Type Communications (MMTC) 5G network slice, an Ultra-Reliable Low Latency Communication (URLLC) 5G network slice, or a Public Safety (PS) 5G network slice.

The UE 110 within the context of FIG. 2 is a trusted UE that can authenticate with the operator core network 106 via a connection with RAN 204. Moreover, as shown in FIG. 2, the data usage record synthesizer 160 may be executed directly on the UE 110 so that the UE 110 can self-report its network data usage to the data usage ledger 130. The data usage record synthesizer 160 may comprise a trusted application executing on the UE 110 that evaluates and classifies data usage by the UE 100 in terms of data type and quantity of data usage. In some embodiments, the data usage record synthesizer includes a data usage classification model that evaluates data packets representing a data usage instance by the UE 110, and based on those data packets classifies the data usage as a particular type and quantity. In some embodiments, based on a classification of a data usage instance, the data usage record synthesizer 160 determines content of one or more ledger fields of a ledger record, populates the ledger record with the determined content, and transmits the ledger record for recordation in the immutable data usage ledger 130.

Figure 3:
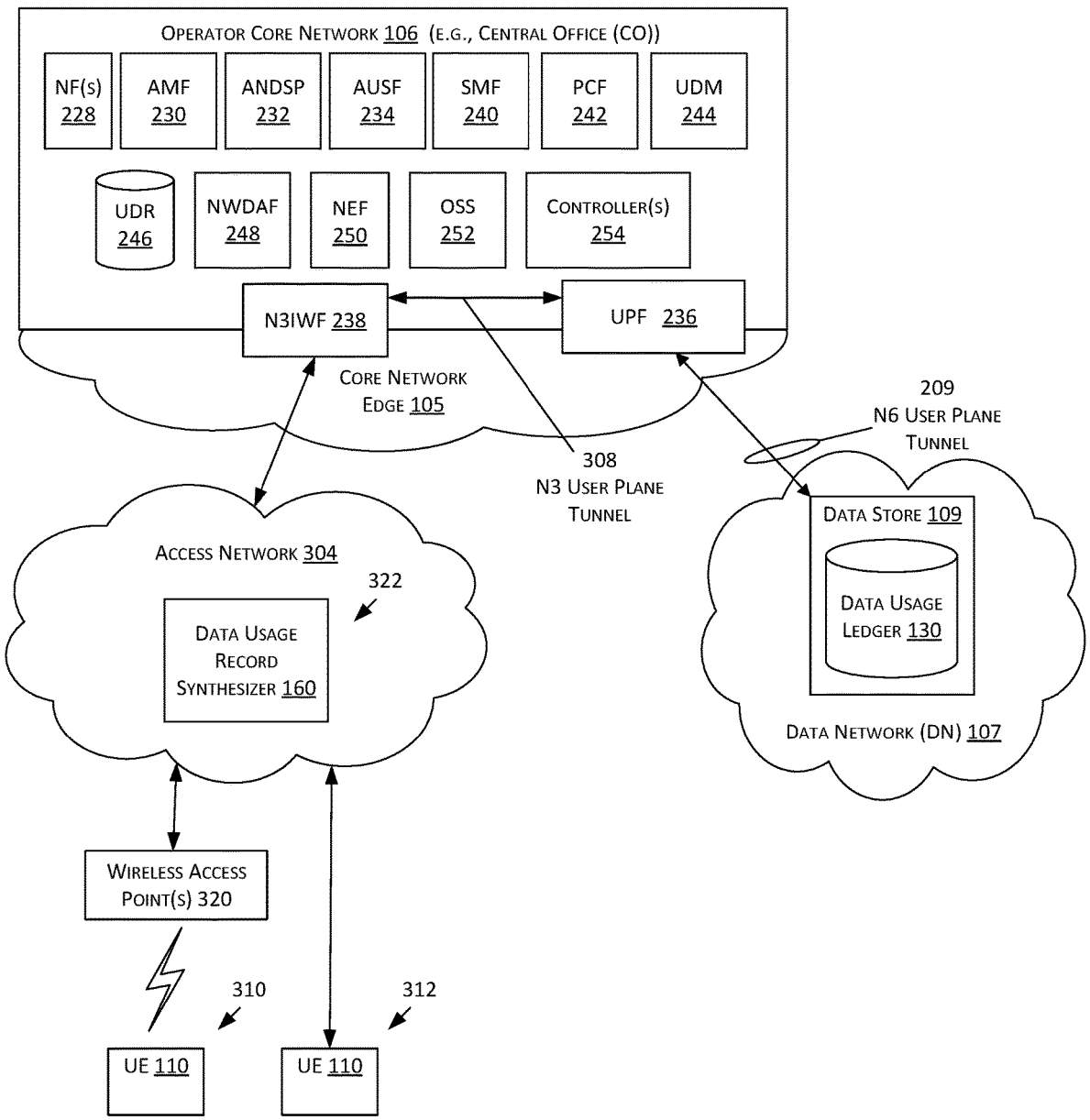
FIG. 3 is a diagram illustrating an example implementation of an operator core network for a networking environment comprising a non-3GPP access network, in accordance with some embodiments described herein.

Referring now to FIG. 3, FIG. 3 illustrates an example implementation of the networking environment 100 of FIG. 1, wherein the access network 104 comprises a non-3GPP access network 304 (such as a customer premise equipment (CPE) network for example). For example, the access network 304 may comprise a wide area network (WAN) or local area network (LAN) and/or may include one or more wireless access points (WAPs) 320. In such embodiments, the non-3GPP access network 304 represents an untrusted network from the perspective of the operator core network 106, and the UE 110 access the access network 304 represent untrusted UE 110. Accordingly, communication between the operator core network 106 and UE 110 may be established via the non-3GPP Interworking Function (N3IWF) 238. For example, in some embodiments, a UE 110 (such as shown at 310) may authenticate with a WAP 320 to establish a wireless communications link with the access network 304. In some embodiments, a UE 110 (such as shown at 312) may be coupled using a network cable to establish a wired network communication link with the access network 304.

The non-3GPP network 303 may be couple to, and authenticated with, the N3IWF 238 of the operator core network 106. For example, an IPsec user plane tunnel and/or IPsec control plane tunnel may be created to establish a secure communication link between the UE 110 and the N3IWF 238. The N3IWF 238 may be coupled to the UPF 236 by a communication link that includes an N3 user plane tunnel 308. For example, the N3 user plane tunnel 308 may connect a router or network gateway of the non-3GPP access network 304 to an N3 interface of the UPF 236.

In some embodiments, a UE 110 coupled to the operator core network 106 through the N3IWF 238, may be considered an untrusted UE from the perspective of the operator core network 106, but non-the-less have ample computing resources to execute a data usage record synthesizer 160. In those cases, the UE 110 may comprise a data usage record synthesizer 160 that functions in the same manner as described herein for a trusted UE 110 (such as illustrated in FIG. 2) with the exception that the data usage record synthesizer 160 communicates ledger records to the data usage ledger 130 using the N3IWF 238 rather than by directly accessing the UPF 236.

In other embodiments, a UE 110 may be computing resource limited or for other reasons cannot, or does not, support executing a data usage record synthesizer 160. For example, a UE 110 may comprise a sensor device (such as a temperature sensor) that has a rudimentary processing capacity to digitize sensor measurements, and execute a TCP/IP stack to format those sensor measurements as IP packets for consumption by other devices on the access network 304, but otherwise lack the capacity to execute an application that can generate a ledger record having a sense of truth. In order to capture in the data usage ledger 130 data usage instance by such UE 100, a data usage record synthesizer 160 (such as shown at 322) may be implemented at least in part as a network edge application, on a network node of the access network 304 and/or the core network edge 105) rather than on the UE 110. In such implementations, access network 304 traffic that is routed to and/or from the UE 110 may be passed through or otherwise made observable to the network edge hosted data usage record synthesizer 106, classified, and capture as ledger records in the same manner as described herein. The data usage record synthesizer 106 communicates those ledger records to the data usage ledger 130 using the N3IWF 238 rather than by directly accessing the UPF 236.

Figure 4:
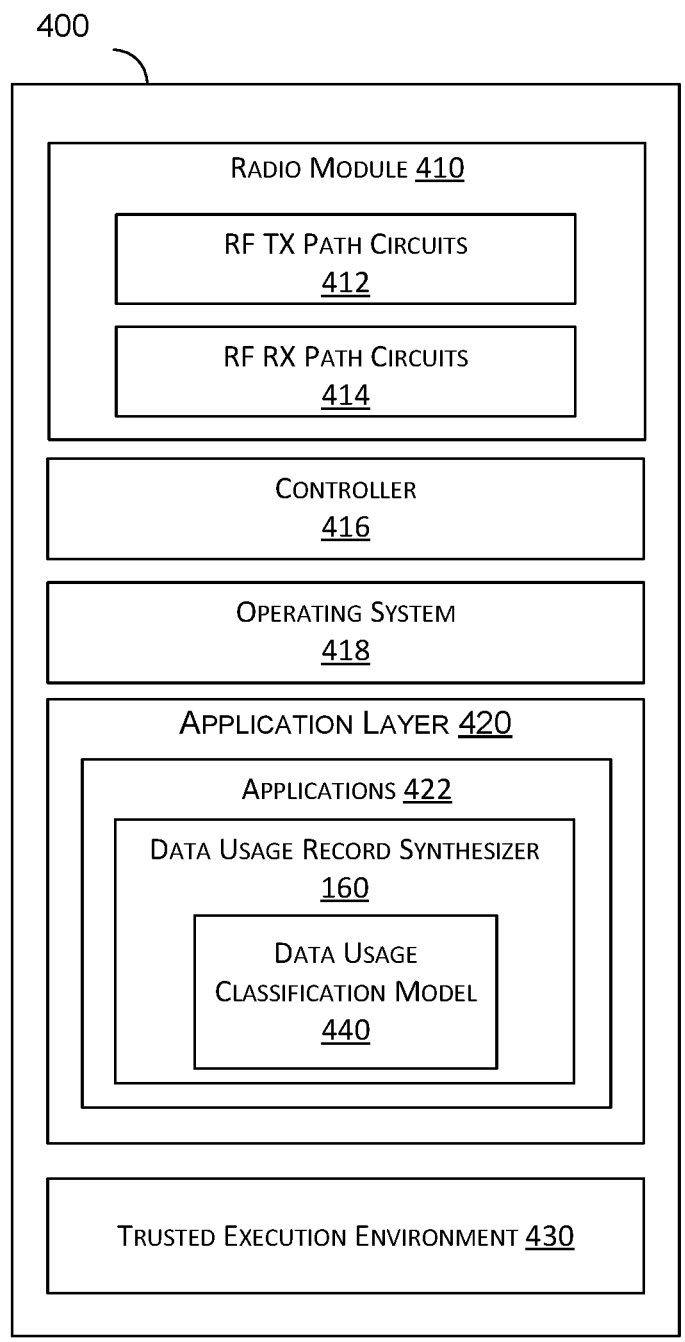
FIG. 4 is a diagram illustrating example user equipment, in accordance with some embodiments described herein.

With reference now to FIG. 4, FIG. 4 illustrates an example UE 400 that executes one or more elements of a data usage record synthesizer 160. In some embodiments, the UE 400 shown in FIG. 4 comprises a trusted UE 110. Although some UEs may include different or other components, generally UE 400 includes at least one radio module 410 that includes one or more RF transmit (TX) path 412 circuits, one or more RF receive (RX) path 414 circuits, and a controller 416. Configuration of the RF TX path 412 and/or RF RX path 414 may be controlled by the radio module 410, for example based on commands from the operating system 418 or other applications executed on the controller 416. In some embodiments one or both of the TX path 412 and/or RF RX path 414 may comprise a plurality of RF paths, each corresponding to different frequency bands. As a trusted UE, the UE 400 in FIG. 4 may authenticate with the operator core network 106 and access the telecommunications network through the RAN 204 (for example, using the radio module 410).

In the embodiment shown in FIG. 4, the UE 400 includes operating system 418 and one or more executable applications 422 that are executed by the controller 416 to implement the one or more functions of the UE 110 described herein. Generally a UE 400 includes at least application layer 420 and may include a trusted execution environment (TEE) 430. The application layer 420 facilitates execution of the UE 400 operating system 418 and executables (including applications 422). In other words, the application layer 420 provides the direct user interaction environment for the UE 400. TEE 430 facilitates a secure area of the processor(s) of UE 400. That is, TEE 430 provides an environment in the UE 400 where isolated execution and confidentiality features are enforced. Example TEEs that may be used for UE 400 include, but are not limited to, Arm TrustZone technology, Software Guard Extensions (SGX) technology, Reduced Instruction Set Computer-Five (RISC-V), or similar technologies.

In some embodiments, application layer 420 may include applications executed in a rich environment and/or applications executed in the TEE 430. For example, the application layer 420 may comprise the data usage record synthesizer 160, and the data usage record synthesizer 160 may include a data usage classification model (shown at 440). The data usage record synthesizer 160 and/or data usage classification model 440 may be executed in the rich environment, and/or at least partially executed in the TEE 430. That is, the data usage record synthesizer 160 may be implemented at least in part as a "trustlet" in a trusted environment protected from tampering or manipulation by a hardware Root of Trust and hosted from the TEE 430. Generally, computer readable code executed in the TEE 430 is referred to as a "trustlet". A trustlet can securely access data stored memory of the UE 400 that is otherwise inaccessible in the application layer 420. A trustlet may take the form of trusted processes, secure processes, isolated user mode (IUM) processes, or the like. For example, a trustlet executed in TEE 430 can access system level data (that is, data related to the larger machine the UE 400 in incorporated within), private and/or public keys, and similar data stored, or accessed, by the UE 400. Trustlets can be activated in response to various network or UE operations. For example, a trustlet can be activated by execution of an associated application in the application layer 420. For another example, a trustlet can be activated in response to a command generated by a network (e.g., network operator core 106 of FIG. 1) and communicated to the UE 400. The trustlet(s) activated may vary depending on the service requested. For example, a first trustlet may be activated in response to a voice service. A second trustlet may be activated in response to a messaging service. A third trustlet may be activated in response to a data service that facilitates a telemetry update. Similarly, the trustlet(s) activated may vary within a particular type of service. For example, a fourth trustlet may be activated to support the function of the data usage record synthesizer 160. Specifically an application 422 implementing the data usage record synthesizer 160 may activate one or more trustlets that perform functions of the data usage record synthesizer 160 and/or that may interact with other trustlets. Upon activation, a trustlet performs a set of predetermined operations. The operations can include, but are not limited to: assessing data stored by the UE, (such as a set keys that are embedded directly into a processor or microcontroller during manufacturing, certificates of authority, unique device identifiers, or any other data); monitoring operations of the UE (such as monitoring processor load, microcontroller load, activation of other UE systems, or other similar UE operations); access or monitor operations of other applications executed by the UE; writing data to the memory of UE; activate another trustlet; or any combination thereof.

Figure 5:
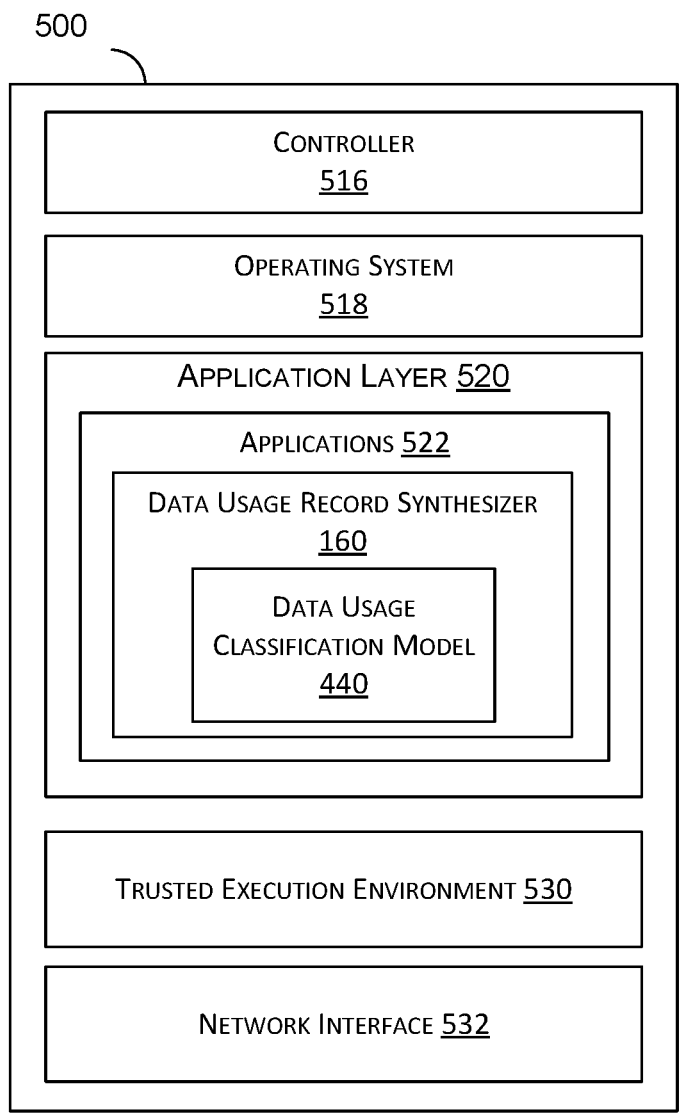
FIG. 5 is a diagram illustrating example network device, in accordance with some embodiments described herein.

Referring now to FIG. 5, FIG. 5 illustrates an example network device 500 that executes one or more elements of a data usage record synthesizer 160. In some embodiments, the network device 500 shown in FIG. 5 comprises a network node or element of an access network (e.g., access network 304) that provides UE 110 (e.g., untrusted UE) access to the operator core network 106 through the N3IWF 238 (e.g., illustrated in FIG. 3). In some embodiments, the network device 500 itself essentially functions as a non-3GPP UE 110 obtaining access via access network 304 to the operator core network 106 through the N3IWF 238. In some embodiments, the network device 500 is a network node of the access network 304 and/or core network edge 105 that is under the control of the operator core network 106 and therefore a trusted component of the telecommunications network.

In the embodiment shown in FIG. 5, the network device 500 includes operating system 518 and one or more executable applications 522 (e.g., the data usage record synthesizer 160) that are executed by the controller 516. The network device 500 may further include at least one network interface 532 for connecting to the access network 304 and/or core network edge 105. For example, in some embodiments, network traffic that is routed to and/or from an untrusted UE 110 via access network 304 may be passed through or otherwise made observable to the data usage record synthesizer 160 through the network interface 532.

Generally, network device 500 includes at least application layer 520 and may include a trusted execution environment (TEE) 530. The application layer 520 facilitates execution of the network device 500 operating system 518 and executables (including applications 522). The network device 500 may include a TEE 530 that operates in substantially the same manner as described with respect to the TEE 430 of FIG. 4, to facilitate a secure area of the processor(s) of network device 500.

The TEE 530 provides an environment in the network device 500 where isolated execution and confidentiality features are enforced. Example TEEs that may be used for network device 500 include, but are not limited to, Arm TrustZone technology, Software Guard Extensions (SGX) technology, Reduced Instruction Set Computer-Five (RISC-V), or similar technologies.

In some embodiments, application layer 520 may include applications executed in a rich environment and/or applications executed in the TEE 530. For example, the application layer 520 may comprise the data usage record synthesizer 160, and the data usage record synthesizer 160 may include the data usage classification model 440. The data usage record synthesizer 160 and/or data usage classification model 440 may be executed in the rich environment, and/or at least partially executed in the TEE 530. That is, the data usage record synthesizer 160 may be implemented in part as a "trustlet" resident on the network device 500, protected from tampering or manipulation by a hardware Root of Trust and hosted from the Trusted Execution Environment (TEE) 530. In some embodiments, TEE 530, and the trustless executed in the TEE 530, operate in the same manner as described with respect to FIG. 4.

Figure 6:
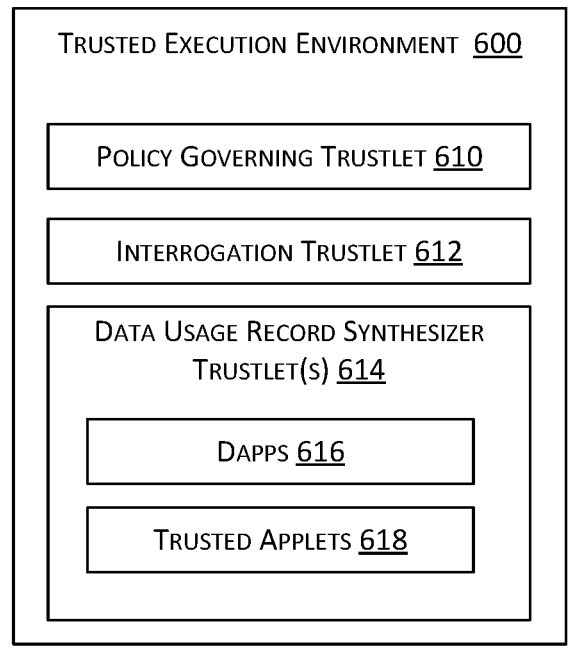
FIG. 6 is a diagram illustrating a trusted execution environment, in accordance with some embodiments described herein.

Referring now to FIG. 6, FIG. 6 illustrates a TEE 600. In some embodiments, TEE 430 of FIG. 4 and/or TEE 530 of FIG. 5 comprise a TEE 600 as described with respect to FIG. 6. As depicted, TEE 600 illustratively may include a policy governing trustlet 610, an interrogation trustlet 612, and one or more data usage record synthesizer trustlets 614. In other embodiments, a TEE 600 may include a fewer or greater number of trustlets.

Policy governing trustlet 610 corresponds to an illustrative example of computer readable code that is activated in response to execution of an application or operation. Upon activation, policy governing trustlet 610 may access a locally stored set of keys corresponding to the application and the UE's and/or network device's processor. Such keys may be utilized for establishing a secured communication link between the data usage record synthesizer 160 and data usage ledger 130 and/or other secured transactions.

Additionally, policy governing trustlet 610 may access a UE's and/or network device's unique device identifier (device ID). The policy governing trustlet 610 may communicate the accessed data to a communication network for analysis. In some embodiments, the device ID may comprise an International Mobile Equipment Identity (IMEI) identifier and/or a Mobile Equipment Identifier (MEID). The IMEI may be stored in a subscriber identity module (SIM) card or embedded SIM (eSIM) of the UE 110 and transmitted to the operator core network 106 as part of the process to authenticate the UE 110. In some embodiments, a device ID may comprise one or more elements of an integrated circuit card identifier (ICCID), a permanent equipment identifier (PEI), mobile subscriber international subscriber directory number (MSISDN), mobile subscription identification number (MSIN), International mobile subscriber identity (IMSI), mobile country codes (MCC), subscription permanent identifier (SUPI), mobile network codes (MNC), and/or other identifier. In some embodiments, the device ID may comprise one or more decentralized identifiers (DIDs), such as World Wide Web Consortium (W3C) DIDs for example. In some embodiments, a device ID comprises a DID that resolves to a DID document. The DID document may be stored at a data registry (e.g., a verifiable data registry). For example, a DID may include a Universal Resource Identifier (URI) that associates a UE 110 (as a DID subject) with a DID document. The DID may include, for example, cryptographic public keys that the UE 110 may use to authenticate itself with the operator core network 106, and prove its association with the DID (e.g., the device ID). In some embodiments, the device ID may be based on a self-sovereign identity (SSI) paradigm where the UE 110 may present its device ID to the operator core network 106, which may verify that the device ID was issued from a trusted issuer. In some embodiments, a device ID may comprise a combination of identifiers such as any of those described herein. The device ID may comprise a combination of hardware identifiers, network address identifiers, serial numbers, component identifiers (e.g., CPU IDs), and/or other identifiers such a as discussed herein. In some embodiment a device ID may be managed (using a Dapp, crypto wallet, or the like, for example) and verified using public-key cryptography in conjunction with a distributed ledger. For example, in some embodiment the device ID for a UE 110 may be generated by back-end block-chain ledger and downloaded to the UE 110.

Interrogation trustlet 612 corresponds to an illustrative example of computer readable code that is activated in response to a command from the communication network. An interrogation trustlet can be activated by a command that is generated in response to a determination that UE 110 is an unknown device or that the UE provided anomalous data for a requested network service. In response to activation, an interrogation trustlet 612 may activate other trustlets, access additional data, or perform any other trustlet operation. The interrogation trustlet 612 may communicate the accessed data to a network function of the operator core network 106. For example, interrogation trustlet 612 can be activated in response to a command that a network function 228 or server application from a server on data network 107 has requested data from one or more trustlets executed in the trusted execution environment 600. In some embodiments, one or more of the data usage record synthesizer trustlets 614 (discussed below) are activated by the interrogation trustlet 612 in response to a command from a server application and/or based on instructions received by communicating with the data usage ledger 130.

The data usage record synthesizer trustlets 614 corresponds to an illustrative example of computer readable code that may be activated in conjunction with the data usage record synthesizer 160. As such, the data usage record synthesizer trustlets 614 may define a component of the data usage record synthesizer 160. Data usage record synthesizer trustlets 614 may include one or more decentralized applications 616, also known as Dapps. Dapps 616 typically operate on a block-chain or network of peer-to-peer computers. In some embodiments, Dapps 616 comprise applications that may engage directly with the data usage ledger 130. In some embodiments, the Dapps 616 utilize smart contracts to generate ledger records of data usage that are recorded to the data usage ledger 130. Other trusted applets 618 may also be executed to perform one or more secure operations with the data usage ledger 130 either instead or, or in conjunction with, the Dapps 616.

Figure 7:
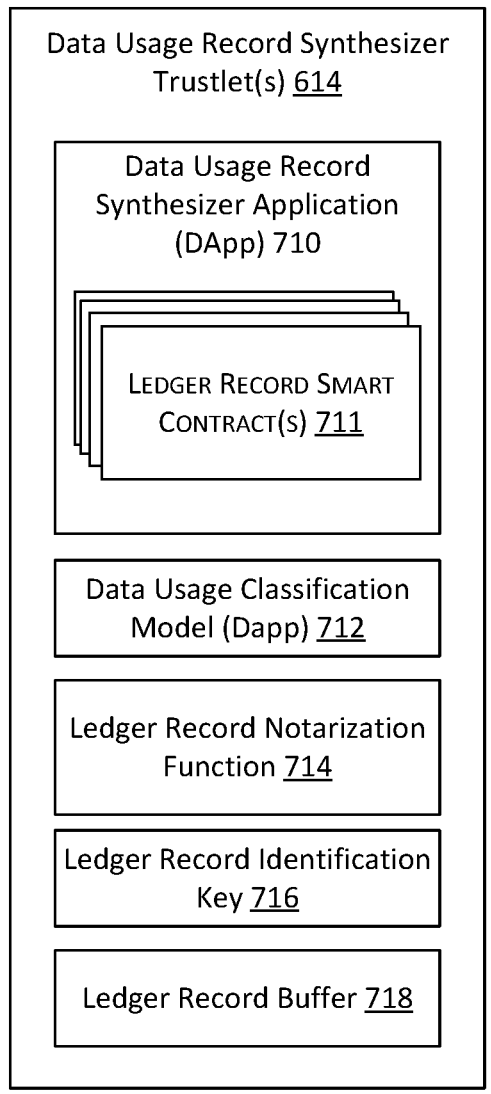
FIG. 7 is a diagram illustrating a data usage record synthesizer trustlet, in accordance with some embodiments described herein.

Referring now to FIG. 7, FIG. 7 illustrates one example architecture of a data usage record synthesizer trustlet 614 that may implement one or more functions of the data usage record synthesizer 160. Here, the computer readable code that is activated comprises a distributed data usage record synthesizer application (DApp) 710 (which may include one or more ledger record smart contracts 711) and a data usage classification model Dapp 712, and may also include one or more of a ledger record notarization function 714, a ledger record identification key 716, and/or a ledger record buffer 718. It should be appreciated that various alternate implementations may omit one or more of these elements or include other elements.

A distributed application, such as Dapps 710 and 712, comprises a top-tier definition for an application programmable interface (API) that is coded specifically to control a block-chain or distributed ledger instance and, in some implementations, are embedded directly into the blocks themselves (to form what is referred to as a smart contract (SC)). In some embodiments, usage data is reported back to the data usage ledger 130 as blocks (e.g., block-chain blocks) in the form of ledger records generated by the Dapp 430. Each ledger record may comprise a record of data usage by a UE 110 for a data usage instance (e.g., a data session or data session segment). The distributed data usage record synthesizer Dapp 710 may assemble data usage information into ledger records for recordation in the immutable data usage ledger 130 based on a classification of the data usage generated by the data usage classification model Dapp 712. In some embodiments, the functions of the data usage classification model Dapp 712 described herein are integrated into the distributed data usage record synthesizer Dapp 710.

When a distributed application, such as such as Dapps 710 and 712, is implemented using one or more smart contracts (such as the ledger record smart contracts 711), there can be as many stipulations as needed programmed into the smart contract to satisfy the participants (i.e., the wireless network provider and/or the UE owner/operator) that the data usage data is gathered and recorded with integrity. For example, a preprogramed smart contract may establish terms upon which the data elements of data usage data will determine how transactions and data are represented on a block-chain or ledger record produced by the data usage record synthesizer 160. Such a smart contract utilizes "if/when . . . then . . . " rules that govern the data indicators and to explore possible exceptions that might affect the fidelity of the collected TC data and its viability as trusted data. In some implementations, exceptions are delegated to a reference chain that contains variations of programming that differ from the priority smart contract program. In some embodiments, a data share location where the collected data usage data can be securely stored may be defined by the data usage record synthesizer trustlet 614 and/or other trustlet.

Generally, the Dapps 710 and 720 may be placed behind a hardware Root of Trust (e.g., within the TEE 600), providing for total attestation of the ledger records sent to the data usage ledger 130. The wireless network operator (e.g., the service carrier) may hold the certificates of authority that created any associated secure area (e.g., TrustZone) and those certificates may be stored in a protected space. For example, a ledger record identification key 716 may be comprised within the data usage record synthesizer trustlet 412, or within the DApp 710 itself, that authenticates trust in the data usage record synthesizer trustlet 412 to the data usage ledger 130. If the UE 110 does not support a TEE 600 or other hardware root of trust mechanism, then the Dapps 710, 712 may instead be implemented in the rich environment (RE) of the UE 110 and utilize a software trust mechanism. For example, the data usage record synthesizer 160 may rely on a software root of trust where authentication of the UE 110 (e.g., the UE device ID 418) via standard network access authentication processes that are utilized in combination with digital notarization stamps on received data (discussed below), and/or generating a distinct hash identity for each ledger record.

In some embodiments, a ledger record notarization function 714 generates a form of self-attestation that data blocks received by the data usage ledger 130 were indeed generated by a trusted DApp 710. That is, the ledger record notarization function 714 may stamp ledger records created by the DApp 710 certifying that the DApp 710 is itself certified software that is accurate and free from unauthorized modification or tampering. For example, the notarization stamp may comprise a digital signature (such as but not limited to a public key, a hash of an identification code associated with the DApp 710, or similar authentication) applied to the ledger records. An absence of the notarization stamp may be indicative of a disruption in the process of measuring data usage such that the at least a segment of data of a ledger archive comprising such a ledger record cannot be validated as true.

The ledger record buffer 718 provides a local secure memory where collected ledger record are stored for periods of time where connectivity between a UE 110 and network operator core 106 may be interrupted. When connectivity is restored, the UE 110 can provide from this buffer 718 a record of data usage for the elapsed time where connectivity with the data usage ledger 130 was down. The notary stamp applied to each ledger record may contain selected validators that prove provenance that thus serves as a certification of truth of the DApp 710 and/or Dapp 712.

Figure 8:
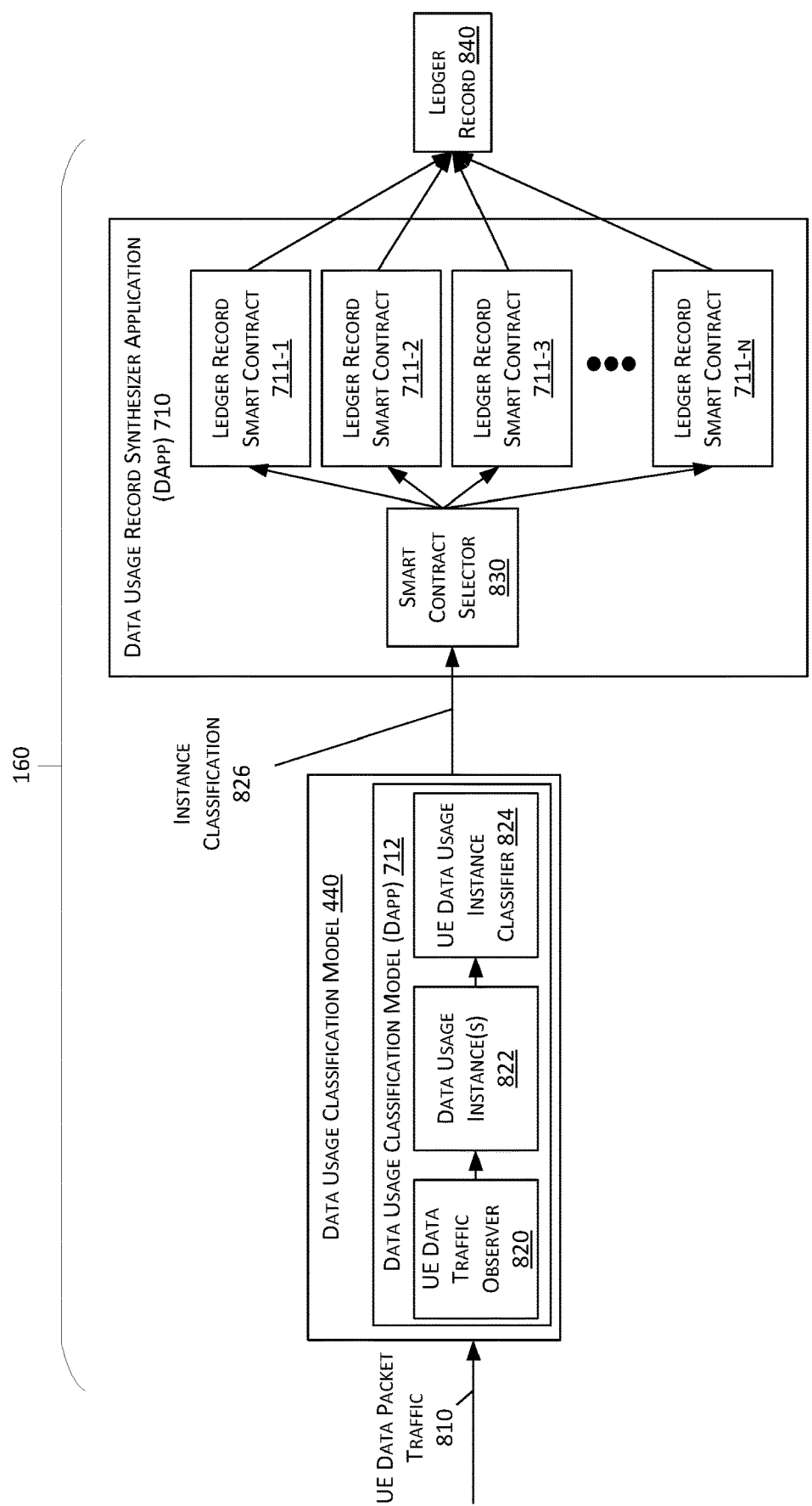
FIG. 8 is a diagram illustrating an example data usage record synthesizer, in accordance with some embodiments described herein.

Referring now to FIG. 8, FIG. 8 is a block diagram further illustrating an example data usage record synthesizer 160 embodiment. In some embodiments, the data usage record synthesizer 160 may comprise a data usage classification model 440 and a data usage record synthesizer application 710. In some embodiments, the data usage record synthesizer application 710 comprises a Dapp, for example, of data usage record synthesizer trustlet(s) 614 executed in a TEE 600. In some embodiments, the data usage classification model 440 is implemented at least in part by executing data usage classification model Dapp 712.

The purpose of the data usage classification model 440 is to detect and evaluate a data traffic flow that carries UE user data, and generate a classification of the of data usage for one or more data usage instances transported within the data traffic flow. The data usage classification model 440 may therefore include a UE data traffic observer 820. The UE data traffic observer 820 may monitor the flow of UE Data Packet Traffic 810 associated with the UE 110 as the UE 110 communicates with the access node 104. In some embodiments, the UE Data Packet Traffic 810 may be routed to flow through the UE data traffic observer 820. In some embodiments, the UE data traffic observer 820 may employ network packet inspection, sniffing, or other known techniques to detect and/or observe packet data for a UE 110 flowing across the access network 104. From an observed set of UE Data Packet Traffic 810, the data usage classification model 440 defines one or more data usage instances 822. Data usage instances 822 comprise data sessions and/or segments of data sessions, that represent data flows between the UE 110 and sources of content and/or services accessible to the UE 110, such as from content-services servers 140 of data network 107, from services made available to the UE 110 by the NEF 250, from data communications between the UE 110 and other UE(s), and/or other data sources.

At any given point in time, a UE 110 may be in the process of conducting network transactions and/or actives that involve many dozens of simultaneous data session. For example, the task of navigating to an Internet website may comprise multiple data sessions as content from several distinct network resources are retrieved to obtain content to display via the web browser application of the UE 110. Further, the web browser application may have multiple web pages opened in different browser tabs, each browser tab likewise establishing multiple data sessions.

Moreover, because the UE 110 may be a multi-tasking device, other applications may be conducting network transactions at the same time the web browser is operation. For example, an email application may be operating in the background with data sessions established with one or more email servers to receive incoming email messages, and/or an SMS messaging application may have background data sessions open to receive SMS messages. The UE 110 operating system itself may have multiple data sessions open while monitoring for software updates or performing other cloud based operations. Accordingly, in some embodiments, many multiple concurrent data usage instances 822 may be defined from observing a set of the UE data packet traffic 810 for any given period of time.

As mentioned, a data usage instance 822 may correspond to a data session, but may also correspond to a segment of a data session. For example, an extended data session (such as associated with downloading a large data file, or receiving content from a data streaming service-such as when consuming a streaming movie) may be processed by the data usage classification model 440 by subdividing the data session into segments and representing each of those segments as an individual data usage instance 822.

In some embodiments, individual data usage instances 822 defined by the UE data traffic observer 820 may be classified by the UE data usage instance classifier 824 to generate an instance classification 826 for individual data usage instances 822. The classification 826 of an individual data usage instance 822 indicates one or both of a type of data usage that occurred during the data usage instance 822 (e.g., email messaging, data file transfer, content streaming, SMS messaging, voice call, web-browsing, teleconferencing, or other data type), and a quantification of the data usage consumed by the data usage instances 822 (e.g., number of events, duration of time (e.g., call minutes), number of megabytes, gigabytes consumed or other quantity of data usage). In some embodiments, the classification of an individual data usage instance 822 may further indicate a quality of service (QOS) level associated with the data usage instance 822 and/or other discernible characteristic of the data usage instance 822.

The data usage classification model 440 may comprise a machine learning model or other logic (e.g., rules-based logic) that reads the UE data packet traffic 810 and classifies the data usage to generate the instance classification 826 for one or more data usage instances 822. For example, the data usage classification model 440 may comprise a machine learning model that is trained to perform a multi-label classification task (e.g., wherein one or more class labels may be predicted for each data usage instances 822). For example, the machine learning model may predict a first class label for a data usage instance 822 comprising a prediction of data usage type, and predict a second class label for that data usage instance 822 comprising a prediction of a quantity of data usage. In some embodiments, the machine learning model may predict an additional class label comprising additional predictions of other characteristics of the data usage instance 822. The machine learning model may be trained to perform end-to-end predictions (e.g., predict multiple class labels from the UE data packet traffic 810 to produce an instance classification 826 for a data usage instance 822) and/or comprise separate classification algorithms to predict the class labels for each class. The data usage classification model 440 may additionally, or alternatively, comprise one or more classification logic algorithms (e.g., a rules based and/or policy application based logic) to determine the multi-class instance classifications 826 for the one or more data usage instances 822. Example classification logic algorithms that may be used by the usage classification model 440 to generate the instance classifications 826 for data usage instances 822 include, but are not limited to, logistic regression algorithms, naive Bayes algorithms, and/or decision tree algorithms.

In some embodiments, the data usage classification model 440 (e.g., the machine learning model and/or classification logic) may compute a confidence value corresponding to the prediction of an instance classification 826, the confidence value indicating the model's confidence that the instance classification 826 comprises an accurate characterization of the data usage for a data usage instance 822. In some embodiments, a threshold is applied to the confidence value so that instance classification 826 for a data usage instance 822 that do not meet at least a predetermined confidence value (a confidence value acceptance criteria) are disregarded. For example, the data usage record synthesizer application (Dapp) 710 may receive instance classification 826 for a data usage instance 822 and assess the confidence value assigned by the data usage classification model 440. Instance classifications 826 that pass the confidence value acceptance criteria are further processed for generating ledger records, while those that do not pass the confidence value acceptance criteria may be disregarded and/or forwarded to another system for further evaluation.

In some embodiments, the data usage record synthesizer application (Dapp) 710 may select between a plurality of ledger record smart contracts (shown at 711-1 to 711-*n*) for generating a ledger record 840 for a data usage instance 822 based on the instance classification 826 predicted for that data usage instance 822. For example, an instance classification 826 may be received at a smart contract selector 830 of Dapp 710, which evaluates the data usage type class label indicated by the instance classification 826 and executes one or more of the ledger record smart contracts (711-1 to 711-*n*) based on the data usage type class label predicted for that data usage instance 822. For example, the Dapp 710 may include a first ledger record smart contract (e.g., 711-1) for processing data usage instances classified as content streaming, a second ledger record smart contract (e.g., 711-2) for processing data usage instances classified as email messaging, a third ledger record smart contract (e.g., 711-3) for processing data usage instances classified as a voice call, and so forth with individual ledger record smart contracts associated with different data usage type class labels. The smart contract selector 830 of Dapp 710 executes a ledger record smart contract in response to the data usage type class label indicated by the instance classification 826, and that executed ledger record smart contract generates a ledger record 840, which comprises a data object characterizing the data usage of the associated data usage instance 822 that may be recorded in the immutable data usage ledger 130. The term data object may refer to a region of computer data storage that includes a value or group of values, and may be generated in the memory of the trusted execution environment, for example.

The selected ledger record smart contract may be programmed to generate a ledger record 840 comprising a designated set of ledger fields, record structure and/or format, information, and/or metadata about the set of UE data packet traffic 810 defined by the data usage instance 822 including data from the instance classification 826, specifically tailored (e.g., by the network operator) for documenting data usage information deemed relevant for that particular type of data usage. Further examples of information which a ledger record smart contract may be programmed to record to ledger fields of a ledger record 840 are discussed below with respect to FIG. 9.

In some embodiment, selected ledger record smart contract may record to the ledger record 840 the results of one or more computations derived from data included in the instance classification 826. For example, the elected ledger record smart contract may be programed to multiply the predicted quantity of data usage by a rate and/or rate scale (and/or apply another function) to compute a tariff associated with that data usage instance 822, which may be recorded in a field of the ledger record 840. A ledger client system 150 may then read that information from the data usage ledger 130 to accumulate a record of data usage and tariff accumulation for a UE 110 and ascribe that information to the account of a subscriber responsible for that UE 110. For example, based on an accumulated record of data usage available from the data usage ledger 130, a subscriber may determine the types of activities that the UE 110 on their account are being utilized for on the telecommunications network. In other implementations, a ledger client system 150 may initiate a remittance action with respect to the subscriber based on an indicated tariff in a ledger record 840 as recorded to the data usage ledger 130. In still other implementations, the network operator of the operator core network 106 may use a ledger client system 150 to process ledger records 840 from the data usage ledger 130 for purposes of network upgrade planning and/or troubleshooting. Regardless of the reason why the ledger client system 150 accesses ledger records 840 from the data usage ledger 130, the ledger client system 150 can trust and rely on the information stored in the ledger records 840 as having a sense of truth because the ledger records were each generated by a tamperproof, unalterable smart contract and/or trusted application of a data usage record synthesizer 160, and because the ledger records 840 ledger record are stored to an immutable ledger. The data usage ledger 130 may therefore be trusted as a repository comprising ledger records that present accurate representations of data usage. Moreover, the data usage ledger 130 in conjunction with data usage record synthesizer 160 represents a restructuring of network components that yields more efficient network utilization. That is, the data usage ledger 130 is a repository that functions as a source that ledger client systems 150 can refer to for trusted information in a standardized format (e.g., based on the programming of the record ledger smart contract). These embodiments avoid the substantially more complex, resource intensive, and time consuming, tasks of using core network nodes for collecting, collating, and formatting raw call detail records detailing data usage from multiple mediation platforms across the network, processing and reformatting those raw records, and transmitting the usage information to one or more systems that use that data. Bandwidth and energy are conserved because the transmission of numerous large data files across the network is avoided. Moreover, with the embodiments described herein, trusted data usage information for a UE is generated at the network edge, and then available from the data usage ledger 130 almost immediately for use by the ledger client systems 150. In some embodiments, the data usage ledger 130 may be an integrated component of a ledger client system 150 such that the ledger client system 150 may advantageously automatically perform one or more operations directly in response to receiving a ledger record 840 at the data usage ledger 130. Further, the data usage ledger 130 serves as an archive ledger records that may be used as objective evidence of data usage by a UE because both the information collected for use in the ledger records, and the ledger itself, have a sense of truth.

Figure 9:
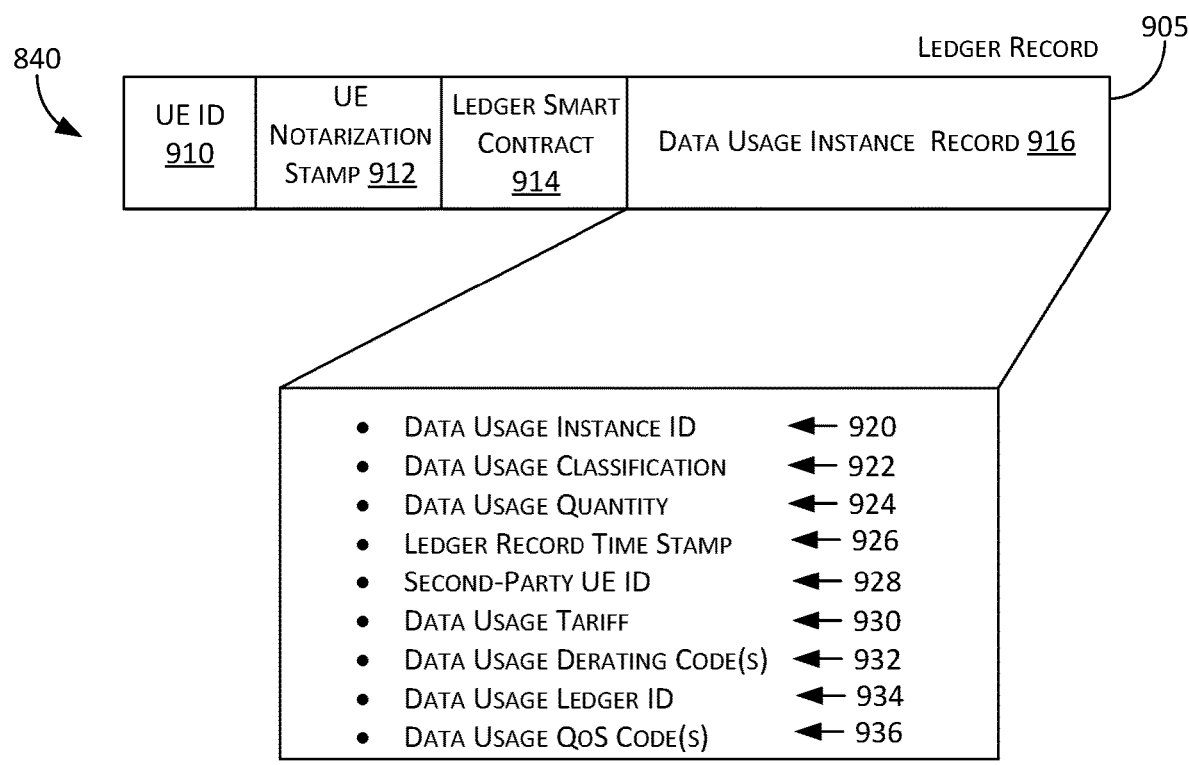
FIG. 9 is a diagram illustrating an example ledger record, in accordance with some embodiments described herein.

Referring now to FIG. 9, FIG. 9 illustrates an example ledger record 840 generated by the data usage record synthesizer 160 for storage in the immutable data usage ledger 130.

A ledger record 840 comprises at least one block 905, the block 905 and ledger record 840 associated with a data usage instance 822 defined by the data usage classification model 440 from a set of UE data packet traffic 810. In some embodiments, the block 905 is structured as a block-chain block for inclusion in a block-chain structure of the data usage ledger 130. The ledger record 840 may comprise a unique identification code 910 for the UE 110 (such as the device ID discussed above, for example). The ledger record 840 may comprise a UE notarization stamp 912 embedded into the ledger record 840 by the ledger record notification function 714. In some embodiments, a ledger record 840 may itself comprise a ledger smart contract 914, which may be used, for example, by a reader of the ledger record 840 in the process of retrieving information about the data usage instance 822. For example, the ledger smart contract 914 may be recorded to the ledger record 840 by the data usage record synthesizer 160 and may include code for interacting with ledger record 840 to perform one or more transactions. As further shown in FIG. 9, the ledger record 840 may include one or more ledger fields populated by the ledger record smart contract 711 that generated the ledger record 840 which may collectively be referred to as a data usage instance record 916. The data usage instance record 916 may include one or more ledger fields that include class labels and other information from the instance classification 826, the results of one or more computations derived from data included in the instance classification 826, and/or other information about the data usage instance 822 derived from the set of UE data packet traffic 810. Example ledger fields that may be included in the data usage instance record 916 include any one or more of, but not limited to, the following. The data usage instance record 916 may include a data usage instance ID 920, which comprises an identifier uniquely associated with the data usage instance 822 corresponding to the ledger record 840. As previously discussed, the ledger record 840 may include ledger fields comprising a data usage classification 922 and data usage quantity 924 predicted by the data usage classification model 440. The data usage instance record 916 may include a ledger record timestamp 926, indicating a time and/or date of the data usage instance 822. The data usage instance record 916 may include a second-party UE ID 928, for example the device ID of another UE communicating with the UE 110 as represented by the data usage instance 822. The data usage instance record 916 may include a data usage tariff 930 computed by the ledger record smart contract 711 as previously discussed. The data usage instance record 916 may include one or more data usage derating codes 932 indicating one or more special circumstances applicable to the data usage instance 822. For example, if the data usage instance 822 corresponded to a call to emergency services (e.g., a 911 call), or a call or data usage that occurred during an emergency, disaster, or similar special event, then that use may be indicated by the data usage derating codes 932. The data usage instance record 916 may include a data usage ledger ID 934 that indicates the intended data usage ledger 130 that is the intended destination where the ledger record 840 is to be recorded. The data usage instance record 916 may include one or more data usage QoS codes 936 corresponding to a quality or service class of the data usage instance 822. These ledger fields are provided as examples and it should be under stood that a ledger record 840 may comprise different and/or a few or greater number of ledger fields that those provided by these examples.

Figure 10:
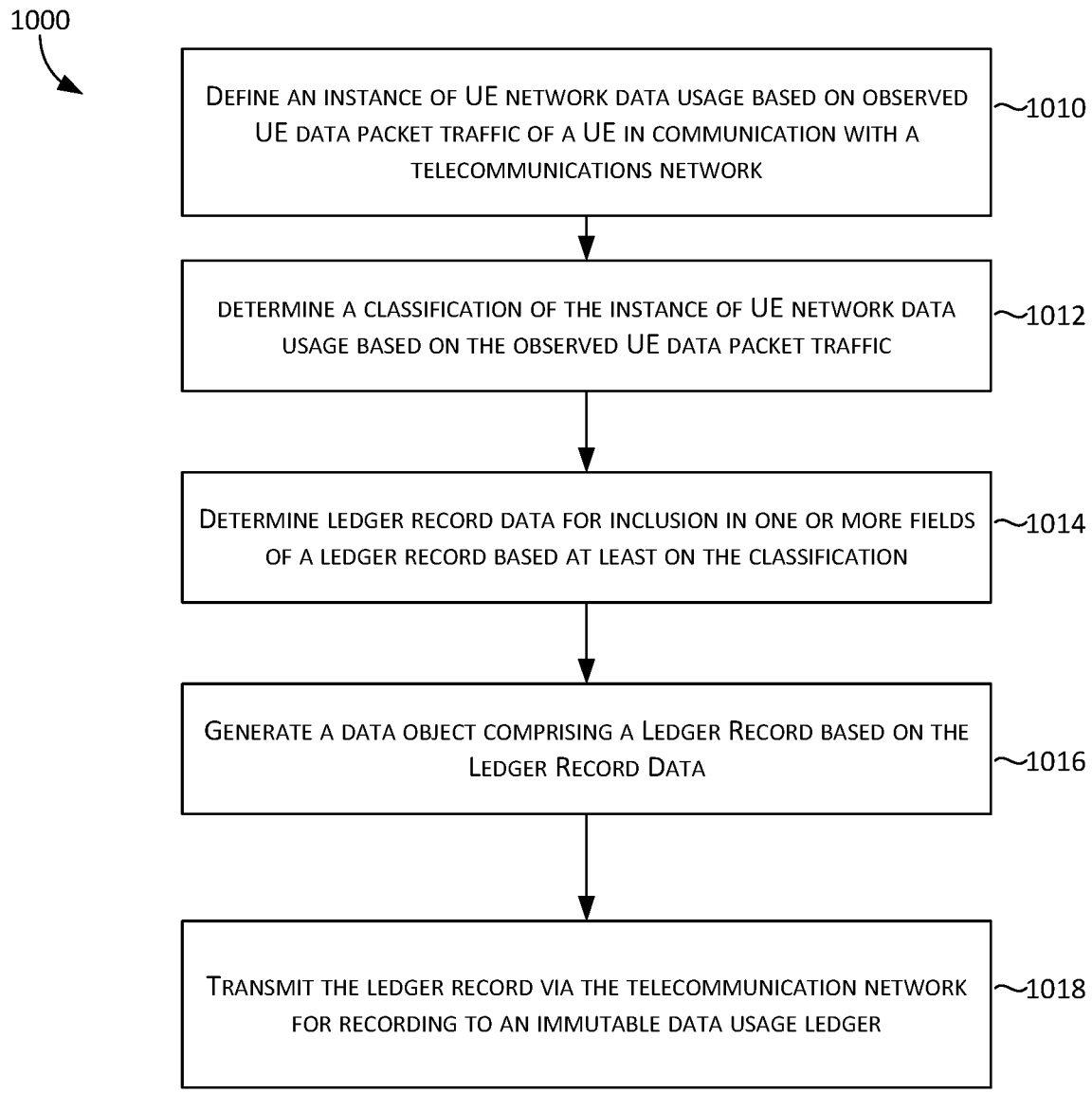
FIG. 10 is a flow chart illustrating an example method for user equipment (UE) network data usage assessment, in accordance with some embodiments described herein.

FIG. 10 is a flow chart illustrating a method 1000 for user equipment (UE) network data usage assessment, according to one embodiment. It should be understood that the features and elements described herein with respect to the method of FIG. 10 may be used in conjunction with, in combination with, or substituted for elements of, any of the other embodiments discussed herein and vice versa. Further, it should be understood that the functions, structures, and other descriptions of elements for embodiments described in FIG. 10 may apply to like or similarly named or described elements across any of the figured and/or embodiments described herein and vice versa. In some embodiments, elements of method 1000 are implemented utilizing one or more processing units of a UE 110, UE 400, and/or a network device 500, as disclosed in any of the embodiments herein.

The method 1000 at 1010 includes defining an instance of UE network data usage based on observed UE data packet traffic of a UE in communication with a telecommunications network. As mentioned, a data usage instance may correspond to a data session, but may also correspond to a segment of a data session. For example, an extended data session (such as associated with downloading a large data file, or receiving content from a data streaming service-such as when consuming a streaming movie) may be processed by the data usage classification model 440 by subdividing the data session into segments and representing each of those segments as an individual data usage instance. In some embodiments, a UE data traffic observer monitors the flow of UE data packet traffic associated with the UE 110 as the UE 110 communicates with the access node 104. In some embodiments, the UE data packet traffic may be routed to flow through the UE data traffic observer. The UE data traffic observer may execute network packet inspection, sniffing, or other known techniques to detect and/or observe packet data flowing in, and/or out of, a UE 110. From an observed set of UE data packet traffic, the data usage classification model may define one or more data usage instances.

The method 1000 at 1012 includes determining a classification of the instance of UE network data usage based on the observed UE data packet traffic. In some embodiments, the classification indicates a type of data usage of the instance of UE network data usage and/or a quantification of data usage consumed by the instance of UE network data usage. In some embodiments, one or more processors execute a data usage classification model as discussed herein. The data usage classification model defines the instance of UE network data usage and/or generates the classification based on the observed UE data packet traffic. In some embodiments, the data usage classification model may comprise a machine learning model or other logic (e.g., rules-based logic) that reads the UE data packet traffic and classifies the data usage to generate the instance classification for one or more data usage instances. The data usage classification model may perform a multi-label classification task with the data usage classification model to predict one or more class labels for the instance of UE network data usage, and/or determine the classification of the instance of UE network data usage based on the one or more class labels.

The method 1000 at 1014 includes determining ledger record data for inclusion in one or more fields of a ledger record based at least on the classification. The ledger record data may characterize the instance of UE network data usage. For example the classification may indicate a type of data usage indicated by the instance of UE network data usage and/or a quantification of data usage consumption indicated by the instance of UE network data usage. In some embodiments, the method includes determining a format for recording the ledger record data to the one or more fields of the ledger record based at least in part on a policy associated with a ledger client system that accesses the data usage ledger. In some embodiments, a ledger smart contract is recorded in the ledger record. For example, the ledger smart contract may include code used for interacting with the ledger record to perform one or more transactions. The one or more fields of the ledger record may include one or more of, but not limit to: a UE identification code of the UE, a data usage instance ID of the instance of UE network data usage, a data usage classification of the instance of UE network data usage, a data usage quantity of the instance of UE network data usage, a ledger record timestamp of the instance of UE network data usage, a second-party UE ID, a data usage tariff corresponding to the instance of UE network data usage, one or more data usage derating codes, a data usage ledger ID that indicates an identity of the immutable data usage ledger, and a data usage quality of service (QOS) code for the instance of UE network data usage.

The method 1000 at 1016 includes generating a data object comprising a ledger record based on the ledger record data. In some embodiments, the method generates the ledger record as a block-chain block for inclusion in a block-chain structure of the immutable data usage ledger. The method may select a ledger record smart contract from a plurality of ledger record smart contracts based on the classification, and execute the ledger record smart contract to generate the ledger record and determine the fields included in the ledger record. The smart contract may be executed in a trusted execution environment. In some embodiments, the one or more fields of ledger record data are formatted based on a ledger record format of a network hosted immutable ledger. In some embodiments, the method determines a format for recording the ledger record data to the one or more fields of the ledger record based at least in part on a policy associated with a ledger client system that accesses the data usage ledger. For example, a smart contract may be programed to record data fields into a ledger record using a JavaScript Object Notation (JSON) data record format, extensible markup language (XML) data record, and/or other data record format used by an expected reader of the ledger record. In some embodiments the smart contract creating the ledger record may communicate with the data usage ledger to determine, at least in part, how to format data recorded to the ledger record.

The method 1000 at 1018 includes transmitting the ledger record via the telecommunication network for recording to an immutable data usage ledger. The immutable data usage ledger may comprises, for example, a distributed ledger technology (DLT), a Hyperledger technology, or another block-chain technology. Once recorded to the ledger records describing network data usage may be used by network planners for network capacity planning, for example to determine when and how to implement network expansions or upgrades. Network ledger records describing network data usage may be used by network technicians to manage network traffic, detect and/or troubleshoot network operation anomalies er such as equipment crashes (e.g., equipment failures) or malicious activity (e.g., hacking or other unauthorized activities). In some embodiments, network ledger records describing network data usage may be used for billing purposes, such as to obtain a remittance from subscribers for data usage such as for use by rating engines, retail and/or wholesale billing, network capacity planning. In some embodiments, one or more ledger client systems may access records of the data usage ledger to perform one or more operations, as discussed herein.

Figure 11:
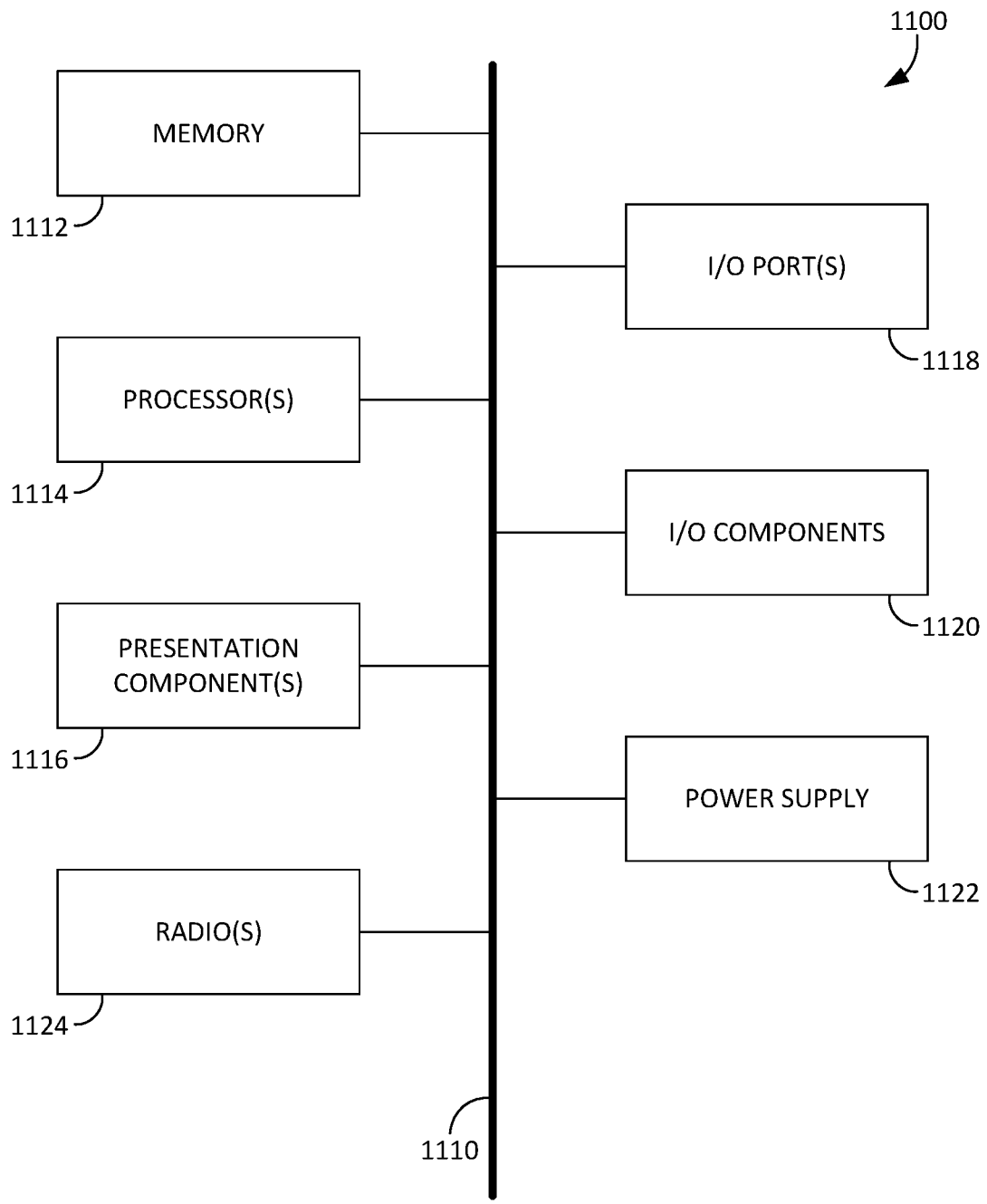
FIG. 11 is an example computing device, in accordance with some embodiments described herein.

Referring to FIG. 11, a diagram is depicted of an exemplary computing environment suitable for use in implementations of the present disclosure. In particular, the exemplary computer environment is shown and designated generally as computing device 1100. Computing device 1100 is but one example of a suitable computing environment and is not intended to suggest any limitation as to the scope of use or functionality of the embodiments described herein. Neither should computing device 1100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 11, computing device 1100 includes bus 1110 that directly or indirectly couples the following devices: memory 1112, one or more processors 1114, one or more presentation components 1116, input/output (I/O) ports 1118, I/O components 1120, power supply 1122, and radio 1124. Bus 1110 represents what may be one or more busses (such as an address bus, data bus, or combination thereof). The devices of FIG. 11 are shown with lines for the sake of clarity. However, it should be understood that the functions performed by one or more components of the computing device 1100 may be combined or distributed amongst the various components. For example, a presentation component such as a display device may be one of I/O components 1120. In some embodiments, the UE 110 may comprise a computing device 1100. In some embodiments, the data usage record synthesizer 160 may be implemented on a network node of core network edge 105 that may comprise a computing device 1100. The processors of computing device 1100, such as one or more processors 1114, have memory. The present disclosure hereof recognizes that such is the nature of the art, and reiterates that FIG. 11 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 11 and refer to "computer" or "computing device." In some embodiments, the data usage record synthesizer 160, or other components of the UE 110, access network 104, operator core network 105, data usage ledger 130, or other components as described in any of the examples of this disclosure may be implemented at least in part by code executed by the one or more processors(s) 1114. The data usage ledger 130 may be stored or otherwise implemented at least in part by memory 1112.

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. Memory 1112 may be removable, non-removable, or a combination thereof. Exemplary memory includes solid-state memory, hard drives, optical-disc drives, etc. Computing device 1100 includes one or more processors 1114 that read data from various entities such as bus 1110, memory 1112 or I/O components 1120. One or more presentation components 1116 presents data indications to a person or other device. Exemplary one or more presentation components 1116 include a display device, speaker, printing component, vibrating component, etc. I/O ports 1118 allow computing device 1100 to be logically coupled to other devices including I/O components 1120, some of which may be built in computing device 1100. Illustrative I/O components 1120 include a microphone, joystick, game pad, satellite dish, scanner, printer, wireless device, etc.

Radio(s) 1124 represents a radio that facilitates communication with a wireless telecommunications network. For example, radio(s) 1124 may be used to establish communications with components of the access network 104, operator core network 106 and/or core network edge 105. Illustrative wireless telecommunications technologies include CDMA, GPRS, TDMA, GSM, and the like. In some embodiments, the radio(s) 1124 comprise circuits that implement the radio module 410 of a UE 110 as described herein. Radio(s) 1124 may additionally or alternatively facilitate other types of wireless communications including Wi-Fi, WiMAX, LTE, and/or other VoIP communications. In some embodiments, radio(s) 1124 may support multi-modal connections that include a combination of 3GPP radio technologies (e.g., 4G, 5G and/or 6G) and/or non-3GPP radio technologies. As can be appreciated, in various embodiments, radio(s) 1124 can be configured to support multiple technologies and/or multiple radios can be utilized to support multiple technologies. In some embodiments, the radio(s) 1124 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 12:
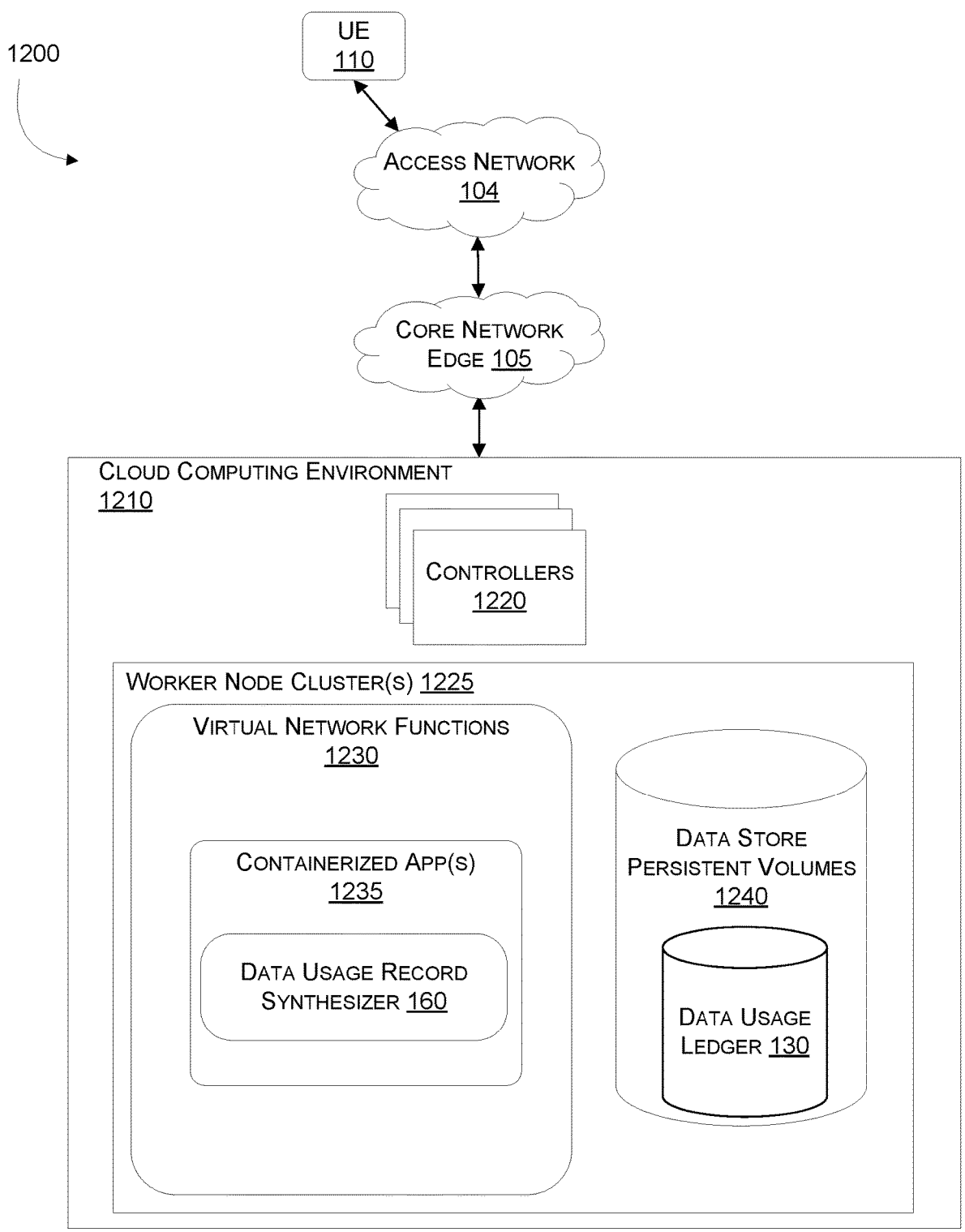
FIG. 12 is an example cloud computing platform, in accordance with some embodiments described herein.

Referring to FIG. 12, a diagram is depicted general at 1200 of an exemplary cloud computing environment 1210 for implementing one or more aspects of a data usage record synthesizer 160 as implemented by the systems and methods described herein. Cloud computing environment 1210 is but one example of a suitable cloud-computing environment and is not intended to suggest any limitation as to the scope of use or functionality of the embodiments presented herein. Neither should cloud-computing environment 1210 be interpreted as having any dependency or requirement relating to any one or combination of components illustrated. In some embodiments, the cloud-computing environment 1210 is executed within operator core network 106, the core network edge 105, or otherwise coupled to the core network edge 105 or operator core network 106.

Cloud computing environment 1210 includes one or more controllers 1220 comprising one or more processors and memory. The controllers 1220 may comprise servers of a data center. In some embodiments, the controllers 1220 are programmed to execute code to implement at least one or more aspects of the data usage record synthesizer 160. For example, in one embodiment the data usage record synthesizer 160 may be implemented as one or more virtual network functions (VNFs) 1230 running on a worker node cluster 1225 established by the controllers 1220. The cluster of worker nodes 1225 may include one or more orchestrated Kubernetes (K8s) pods that realize one or more containerized applications 1235 for the data usage record synthesizer 160. In other embodiments, another orchestration system may be used to realize the data usage record synthesizer 160. For example the worker nodes 1225 may use lightweight Kubernetes (K3s) pods, Docker Swarm instances, and/or other orchestration tools. In some embodiments, the UE 110 may be coupled to the controllers 1220 of the cloud-computing environment 1210 by access network 104. In some embodiments, data usage ledger 130 may be implemented at least in part as one or more data store persistent volumes 1240 in the cloud-computing environment 1210.

In various alternative embodiments, system and/or device elements, method steps, or example implementations described throughout this disclosure (such as the UE, access network, core network edge, operator core network, data usage record synthesizer(s), data usage ledger(s), and/or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Verilog or Very High Speed Integrated Circuit (VHSIC) Hardware Description Language (VHDL).

As used herein, the terms "function", "unit", "server", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for user equipment (UE) network data usage assessment, the system comprising:
   one or more processors; and
   one or more non-transient computer-readable storage media storing computer-usable instructions that, when executed by the one or more processors, cause the one or more processors to:
   define an instance of UE network data usage based on UE data packet traffic carried between a UE and an access network of a telecommunications network;
   determine a classification of the instance of UE network data usage based on the UE data packet traffic;
   select a set of ledger fields for populating a ledger record associated with the UE, the set of ledger fields comprising a combination of one or more fields for the ledger record selected based on the classification;
   determine ledger record data for populating the set of ledger fields, wherein the ledger record data characterizes the instance of UE network data usage;
   generate a data object comprising the ledger record based on the ledger record data; and
   transmit the ledger record via the telecommunications network for recording to an immutable data usage ledger.

2. The system of claim 1, wherein the classification indicates at least one of:
   a type of data usage of the instance of UE network data usage; and
   a quantification of data usage consumed by the instance of UE network data usage.

3. The system of claim 1, wherein the immutable data usage ledger comprises at least one of a distributed ledger technology (DLT), a Hyperledger technology, or a block-chain technology.

4. The system of claim 1, the one or more processors further to:
   generate the ledger record as a block-chain block for inclusion in a block-chain structure of the immutable data usage ledger.

5. The system of claim 1, the one or more processors further to:
   select a ledger record smart contract from a plurality of ledger record smart contracts based on the classification; and
   execute the ledger record smart contract to generate the ledger record.

6. The system of claim 5, the one or more processors further to:
   determine a format for recording the ledger record data to the one or more fields of the ledger record based at least in part on a policy associated with a ledger client system that accesses the immutable data usage ledger.

7. The system of claim 1, the one or more processors further to:
   record a ledger smart contract in the ledger record, the ledger smart contract including code for interacting with the ledger record to perform one or more transactions.

8. The system of claim 1, the one or more processors further to execute a data usage classification model, wherein the data usage classification model defines the instance of UE network data usage and generates the classification based on the UE data packet traffic.

9. The system of claim 8, wherein the data usage classification model comprises one or both of a machine learning model and a classification logic algorithm;
   the one or more processors further to:
   perform a multi-label classification task with the data usage classification model to predict one or more class labels for the instance of UE network data usage; and
   determine the classification of the instance of UE network data usage based on the one or more class labels.

10. The system of claim 1, wherein the one or more fields of the ledger record include one or more of: a UE identification code of the UE, a data usage instance ID of the instance of UE network data usage, a data usage classification of the instance of UE network data usage, a data usage quantity of the instance of UE network data usage, a ledger record timestamp of the instance of UE network data usage, a second-party UE ID, a data usage tariff corresponding to the instance of UE network data usage, one or more data usage derating codes, a data usage ledger ID that indicates an identity of the immutable data usage ledger, and a data usage quality of service (QOS) code for the instance of UE network data usage.

11. The system of claim 1, the one or more processors further to:
   apply a notarization stamp to the ledger record, the notarization stamp certifying that the ledger record is generated by certified software.

12. The system of claim 1, the one or more processors to execute a smart contract on the UE to generate the ledger record.

13. The system of claim 1, the one or more processors to execute a smart contract on a network node of an access network coupled to the telecommunications network to generate the ledger record.

14. A method for user equipment (UE) network data usage assessment, the method comprising:
   defining an instance of UE network data usage based on UE data packet traffic carried between a UE and an access network of a a telecommunications network;
   determining a classification of the instance of UE network data usage based on the UE data packet traffic;
   selecting a set of ledger fields for populating a ledger record associated with the UE, the set of ledger fields comprising a combination of one or more fields for the ledger record selected based on the classification;
   determining ledger record data for populating the set of ledger fields, wherein the classification indicates at least one of: a type of data usage indicated by the instance of UE network data usage and a quantification of data usage consumption indicated by the instance of UE network data usage;

generating a data object comprising the ledger record based on the ledger record data; and transmitting the ledger record via the telecommunications network for recording to an immutable data usage ledger.

15. The method of claim 14, wherein the immutable data usage ledger comprises at least one of a distributed ledger technology (DLT), a Hyperledger technology, or a block-chain technology.

16. The method of claim 14, further comprising:

selecting a ledger record smart contract from a plurality of ledger record smart contracts based on the classification; and executing the ledger record smart contract to generate the ledger record.

17. The method of claim 14, further comprising:

determining a format for recording the ledger record data to the one or more fields of the ledger record based at least in part on a policy associated with a ledger client system that accesses the immutable data usage ledger.

18. The method of claim 14, further comprising:

performing a multi-label classification task using a data usage classification model to predict one or more class labels for the instance of UE network data usage; and determining the classification of the instance of UE network data usage based on the one or more class labels;

wherein the data usage classification model comprises one or both of a machine learning model and a classification logic algorithm.

19. A telecommunications network, the network comprising:

a network operator core, wherein a user equipment (UE) communicates with the network operator core through an access network; and one or more processing units to:

define an instance of UE network data usage based on UE data packet traffic carried between the UE and the access network of the telecommunications network;

determine a classification of the instance of UE network data usage based on the UE data packet traffic;

select a set of ledger fields for populating a ledger record associated with the UE, the set of ledger fields comprising a combination of one or more fields for the ledger record selected based on the classification;

receive via the access network the ledger record, the ledger record structured as a block-chain block; and transport the ledger record for recordation to a data usage ledger, wherein the data usage ledger comprises at least one of a distributed ledger technology (DLT), a Hyperledger technology, or a block-chain technology.

20. The telecommunications network of claim 19, the one or more processing units further to:

determine ledger record data for inclusion in the one or more fields of the ledger record based at least on the classification;

generate a data object comprising the ledger record based on the ledger record data; and transmit the ledger record to the access network.

* * * * *